United States Patent
Zhang

(10) Patent No.: US 6,853,562 B2
(45) Date of Patent: Feb. 8, 2005

(54) VOLTAGE SENSE METHOD AND CIRCUIT WHICH ALLEVIATE REVERSE CURRENT FLOW OF CURRENT BI-DIRECTIONAL CONVERTERS

(75) Inventor: Zhe Zhang, Rancho Santa Margarita, CA (US)

(73) Assignee: Optimum Power Conversion, Inc., Irvine, CA (US)

(*) Notice: Subject to any disclaimer, the term of this patent is extended or adjusted under 35 U.S.C. 154(b) by 0 days.

(21) Appl. No.: 10/607,345

(22) Filed: Jun. 26, 2003

(65) Prior Publication Data
US 2004/0264219 A1 Dec. 30, 2004

(51) Int. Cl.[7] .................... H02M 3/335; H02M 7/122
(52) U.S. Cl. .................. 363/21.06; 363/56.05
(58) Field of Search .................. 363/17, 20, 21.01, 363/21.04, 21.06, 21.14, 39, 40, 49, 56.01, 56.02, 56.05, 97, 98, 127, 131, 132

(56) References Cited

U.S. PATENT DOCUMENTS

| | | | | |
|---|---|---|---|---|
| 5,636,116 A | * | 6/1997 | Milavec et al. ............... 363/89 |
| 5,663,877 A | * | 9/1997 | Dittli et al. ................. 363/127 |
| 5,815,380 A | * | 9/1998 | Cuk et al. ..................... 363/16 |
| 6,038,154 A | * | 3/2000 | Boylan et al. ............... 363/127 |
| 6,760,235 B2 | * | 7/2004 | Lin et al. ................. 363/21.06 |

* cited by examiner

Primary Examiner—Matthew V. Nguyen

(57) ABSTRACT

The Voltage Sense Method is introduced and a number of its implementations using Voltage Sense Circuit are demonstrated to solve problems associated with the start-up of parallel switching converters, each converter having output synchronous rectifiers or more general Current Bi-directional Switches: prevention of the excessive reverse current, elimination of the excess voltage stress of the input switches and elimination of the voltage overshoot in the common output voltage. The Voltage Sense circuit added to each converter generates a Simulated Output Voltage, which predicts how would the output voltage of each particular unit rise during the start-up with enabled synchronous rectifiers if that particular unit were to operate alone. When the simulated output voltage of one converter reaches the actual common output voltage, synchronous rectifiers/CBS switches of that particular converter are all enabled so that their body-diodes, used up until that time to prevent reverse current flow, are by-passed eliminating all start-up problems. The introduced Voltage Sense Method and a number of its Voltage Sense Circuitries are also applicable to solve problems associated with the start-up of the current bi-directional converters with a battery load.

8 Claims, 31 Drawing Sheets

US 6,853,562 B2

VOLTAGE SENSE METHOD AND CIRCUIT WHICH ALLEVIATE REVERSE CURRENT FLOW OF CURRENT BI-DIRECTIONAL CONVERTERS

FIELD OF THE INVENTION

This invention relates to the field of switching DC-to-DC power conversion and in particular to parallel operation with current sharing of switching converters employing one or more synchronous rectifiers (MOSFETs) on their outputs and methods how to ensure smooth start-up with no overshoots.

BACKGROUND OF THE INVENTION

The demand for either higher output power from several smaller off-the-shelf power supplies or their fault-tolerant redundant operation in the case of critical loads, resulted in almost mandatory feature of switched mode power supplies: paralleling with current sharing. The parallel operation means that two or more power supplies are connected to the common source of power and deliver the power to the common load. When parallel operation of switching converter is mentioned, almost invariably the most common first question asked is: how is the load current shared between two converters? Clearly, equal sharing of the total current would be most desirable. Indeed, this is made possible and practical with the advent of the prior-art feedback control and switch protection method called current mode programming. However, a more fundamental second question, which should come even before current sharing question, would be: could the two converters connected in parallel even start properly and go gracefully through the soft-start mechanism without causing any performance problems. Worse yet, could the parallel operation during the start-up result in catastrophic failure of either one or both converters? The answer to that question is affirmative unless measures to prevent that from taking place are undertaken, such as disclosed in this invention.

This invention reveals the sources of such potential problems during the start-up of converter parallel operation and discloses a new method, termed Voltage Sense method, how to prevent such problems during the start-up. A number of alternative circuit implementations of this Voltage Sense method are presented which eliminate those problems during the start-up. The switching converters with diode rectifiers on the output do not experience such start-up problems. However, in majority of the applications for powering modern electronics equipment, the low voltage power supplies are needed with recent 5V voltage standards being replaced with 3.3V, 2.5V and even 1.8V to power modern microprocessors, which require ultra low voltages and very high currents to operate. The switching converters delivering such low output voltages invariably operate with the output rectifier diodes replaced with the synchronous rectifiers, which drastically reduce the voltage drops of the diode switch (typically 0.7V to 1V) to 0.05V or lower voltage drop across MOSFET synchronous rectifier switch, thus dramatically reducing the conduction losses and improving the efficiency of converter operation. The synchronous rectifiers also make each converter current bi-directional, thus allowing the power flow to be also bi-directional. This, in turn, is precisely one of the reasons why the converters with synchronous rectifiers experience series problems, which result in failures when their parallel operation is attempting without recognizing the source of the problems and without use of special circuit preventive measures.

In the past, the prior-art methods and circuit preventive measures have focused on two methods and circuit implementations, termed here Fixed Timing and Current Sense methods, which mitigated only some start-up problems with synchronous rectifiers and even than only to a certain degree but not completely. The third method, termed here Voltage Sense method, of the present invention, solved all these problems as described in more details in later section. All three methods are based on disabling the synchronous rectifiers during the initial start-up, but differ in how the decision to enable synchronous rectifiers is made:

1. Fixed Timing method and circuit implementation enables synchronous rectifiers after a fixed time interval has elapsed from the beginning of the converter operation;
2. Current Sense method and circuit implementation enables synchronous rectifiers based on sensing the DC current delivered by each converter;
3. Voltage Sense method and circuit implementation enables synchronous rectifiers based on sensing the simulated voltage to determine the optimum time to enable synchronous rectifiers.

There are a number of prior-art circuits, which address the start-up problem of parallel converters with output synchronous rectifiers. However, they are all based on various implementations of the Current Sense method in which converter's DC output current is sensed and used to determine the instant at which synchronous rectifiers should be enabled. Three such prior-art patents are:
1. U.S. Pat. No. 5,636,116 by Boylan, et al;
2. U.S. Pat. No. 5,663,877 by Dittly, et al;
3. U.S. Pat. No. 6,038,154 by Milavec, et al.

Based on a number of synchronous rectifiers on the output side, the switching converters could also be divided into following two categories:
1. Switching converters with Single Synchronous Rectifier on secondary side.
2. Switching converters with Two Synchronous Rectifiers on secondary side.

It is demonstrated that Fixed Timing control and Current Sense method and circuit implementations address start-up problems partially and only in converters with single synchronous rectifiers. In addition, some serious problems of excessive voltage stress on input side switching devices for low voltage converters remain. Voltage Sense method, however, is suitable for all converters regardless of number of synchronous rectifiers in the output and eliminates high voltage stress of input switches for the converters with ultra low output voltages such as 1.8V.

Definitions

The following notation is consistently used throughout this text in order to facilitate easier delineation between various quantities:

1. $I_1$, $V_2$—The customary notation is to use capital letters, such as $I_1$ and $V_2$ to designate quantities constant in time, such as DC current in converters or DC voltages. However, herein, during the start-up of the switching converters these quantities are also changing in time, such as for example, the output DC voltage V is increasing gradually from zero volts to its final value, the regulated output voltage. Thus, the DC quantities are for purposes of this disclosure also assumed to be function of time during the start-up transient
2. $S_1$, $S_2$, $S'_1$, $S'_2$—Switch designations respectively for input switch, output switch, complementary input switch, and complementary output switch;

3. D—The duty ratio is defined as $D=t_{ON}/T_S$ where $t_{ON}$ is the ON time interval during which the input switch is closed (turned ON) and $T_S$ is the switching period defined as $T_S=1/f_S$ where $f_S$ is a switching frequency;

4. D'—The complementary duty ratio D' is defined as $D'=t_{OFF}/T_S$ where $t_{OFF}$ is the OFF time interval during which the input switch $S_1$ is open (turned OFF) and the complementary switch $S'_1$ is closed.

Distinction Between Current Bi-Directional and Synchronous Rectifier Switches

It is also important to highlight at the very beginning distinction between Current Bi-directional Switches (CBS) and Synchronous Rectifier Switches. Current Bi-directional Switch (CBS) is a three-terminal, controllable semiconductor switching device, which can conduct the current in either direction between two terminals, when the appropriate control signal is given at the third terminal to turn-ON device. This CBS switch also blocks the voltage of only one polarity between the said two terminals when the control signal is given to the third terminal to turn-OFF device. A good example of such a CBS switch is a power MOSFET transistor, which has also a parasitic body-diode. This body-diode effectively introduces the limitation of voltage blocking capability to one polarity only.

In many applications designed for low output voltages, output diodes are replaced by MOSFET devices to by-pass conduction from the body-diode into a MOSFET channel of a respective device. This special application of MOSFETs is called synchronous rectification to signify the fact that MOSFETS are conducting during exactly the same intervals that their respective body-diodes would have conducted if used alone (CBS switch drive disabled) but in a response to other duty ratio controlled switches in the converter and other converter circuit conditions. Thus, synchronous rectifiers represent a rather limited application of CBS switches, whose timing control is not independent but limited to the conduction times of body-diodes.

CBS switches on the other hand do not have such timing limitations. They are completely independently controlled and can be, for example, turned ON before the internal body-diode would have started conduction in response to converter circuit conditions. The switching converters which use such performance of CBS switches for output rectification are started now to appear, since they bring additional performance features, such as lossless switching and further improved efficiency. Nevertheless, both output CBS output switches, and their limited application as synchronous rectifiers, result in the same problems during the start-up of parallel converters using them. Thus, the Voltage Sense method and its Voltage Sense circuit implementations of the present invention will be equally applicable to both categories of the converters.

SUMMARY OF THE INVENTION

A primary objective of this invention is to provide an effective solution to a number of problems, which occur when one attempts to start two or more switching converters in parallel whereby each switching converter has one or more Current Bi-directional Switches (CBS) in its output. The Current Bi-directional Switches and their special case synchronous rectifiers are capable of conducting the current in either direction. Thus, when one of the parallel converters has started-up and reaches the full output voltage, the second to start converter with CBS switches effectively shorts the common output voltage resulting in large reverse current and in case of a number of parallel units results in excessive current stress and destruction of the CBS switches during the very start-up. The only way to avoid this problem is to start each converter with initially disabled synchronous rectifiers such as MOSFET transistors (or more general CBS switches) so that shorting of the output is prevented since the converters are then operated with built-in body-diodes of MOSFET switches until the final desired voltage is reached. However, what appears to be a solution creates actually following additional problems, which are not resolved by the conventional methods such as Fixed Timing and Current Sense methods.

This invention uncovers for the first time that the voltage stress on input switches in some standard switching converter topologies, such as forward converter with voltage clamp, and at low output voltages, is many times higher during their start-up with diode rectifiers than in steady-state when they are operated with synchronous rectifiers. Thus, another objective of the present invention is to eliminate such excessive voltage stresses on the input switches of each parallel converter during the start-up and make the stresses no higher than in steady-state operation.

Another problem is that the output voltage common to two or more parallel units experiences voltage overshoot at instants when the synchronous rectifiers of each unit are enabled, once again due to effect of the body-diode voltage drop on output DC voltage. Therefore, yet another objective of the present invention is to eliminate these voltage overshoots.

All of these objectives are accomplished by a signal processing circuit added to each of the parallel switching converter units, named Voltage Sense and Synchronous Rectifier Enable Circuit. This circuit named also simply Voltage Sense circuit generates internally to each unit Simulated Output Voltage, since it simulates how would the output voltage of that unit rise during the start-up with enabled synchronous rectifiers if that particular unit were to operate alone. When the rising Simulated Output Voltage during the start-up of respective parallel unit reaches the output voltage common to all converters connected in parallel, the Voltage Sense circuit enables synchronous rectifiers of that respective parallel unit at that instant, which is just the optimum time to eliminate the excessive voltage stresses of input switches of that unit and voltage overshoot of the common output voltage.

A number of embodiments are presented which describe several alternatives how to implement this Voltage Sense circuit. In one of the simplest realizations of the new Voltage Sense method for the case of converters with two output MOSFETs and most likely the best mode to practice this invention, the Voltage Sense circuit is shown to consist of the two signal processing MOSFET transistors connecting their drain terminals to filtering resistors, which in turn, are connected to respective ends of the secondary of the isolation transformer of the converter. The two MOSFET transistors are driven out of phase with each other and with a duty ratio governed by primary side switches. The source terminals of two MOSFETs are connected to a filtering capacitor on which they generate voltage equal to difference between common output voltage and simulated output voltage. This differential signal is then applied to zero crossing comparator to generate a high output signal at zero crossing, which enables synchronous rectifiers of the respective parallel unit.

Unlike other parallel units, the first to start unit exhibits a unique performance with the same Voltage Sense circuit. This first unit clearly starts with zero output voltage, so that its Voltage Sense circuit immediately from the start enables its CBS or synchronous rectifiers resulting in a smooth soft-start of the first unit.

The Voltage Sense method and its Voltage Sense circuit implementation are shown to be general and independent of the switching converter topology, hence can be applied with equal success to converters with one, two, or more synchronous rectifiers/CBS switches in the output, with converters with transformer secondary of the center-tapped or single winding variety, with converters employing complex Integrated Magnetics configurations, etc. In addition, all switching converters with addition of the same Voltage Sense circuit have equal priority, with no master converter with special additional circuitry for Master-slave operation. Thus, any number of units may be operated in parallel, since each unit has its own Voltage Sense circuit.

Similar problems are encountered during the startup of a current bi-directional converter with a battery load. Because of the very low output impedance of the battery, during the startup of the bi-directional converter an excessive reverse current flow could damage converter. Hence, a bi-directional converter with a battery load must start with turned off synchronous rectifiers on its output, i.e., with diode rectifiers only. To enable timely turning on of the synchronous rectifiers and avoid a voltage undershoot/overshoot at the output, the Voltage Sense Method and appropriate Voltage Sense Circuit has to be implemented.

BRIEF DESCRIPTION OF THE DRAWINGS

FIG. 11b illustrates that no increased voltage stress of the primary side switch is present in the Ćuk converter of FIG. 6a.

FIG. 19b shows the characteristic waveforms during the soft-start of first to start Unit 1 of FIG. 19a.

FIG. 31b illustrates the gate drive voltage waveforms during the start-up of the converter of FIG. 31a.

FIG. 35b illustrates current waveforms during starting of two converters of FIG. 35a.

DETAILED DESCRIPTION OF THE INVENTION

Introduction

Figure 1:
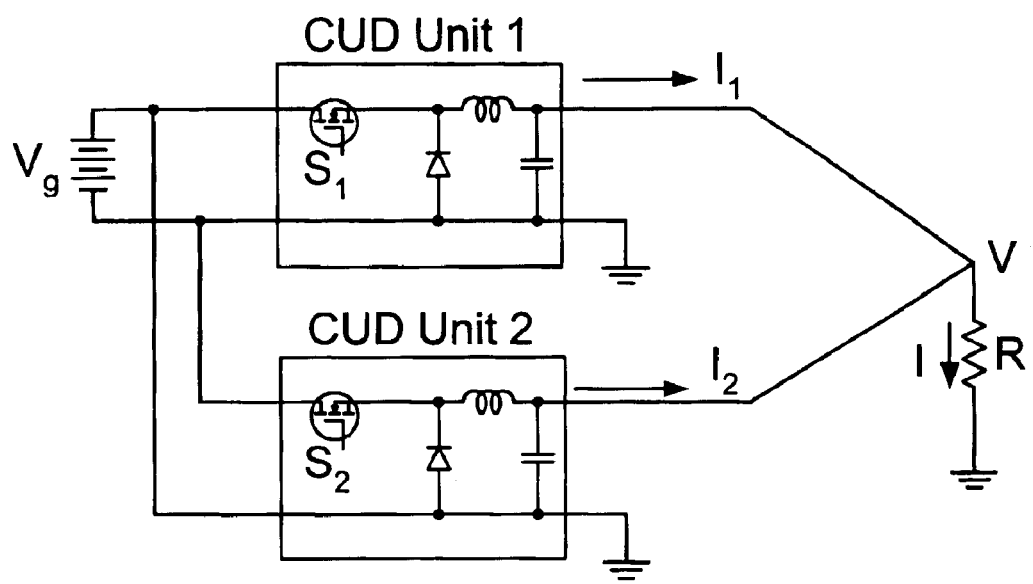
FIG. 1 illustrates prior-art parallel operation of two buck type switching converters with diode outputs.

First we will examine parallel operation of switching converters with diode outputs to establish that the start-up process takes place in a smooth and controlled manner without any adverse performance problems. The prior-art buck converter is used to illustrate the parallel performance during the start-up and is for analysis purposes replaced with Thevenin equivalent circuit model. Then, the same buck converter is shown implemented with synchronous rectifier output and its parallel performance during start-up operation analyzed. This analysis and accompanying salient waveforms reveal some fundamental problems inherent to the start-up operation with synchronous rectifier output enabled from the start, which could lead, if not mitigated, even to catastrophic failure of the converters during the start-up. These problems are related to the current bi-directional nature of the converter with synchronous rectifiers, and the fact that the converter, which starts last, must take as a reverse current the sum of DC currents of all other parallel modules and most likely fail due to excessive current stress during the initial start-up process.

The conventional prior-art solutions, such as Fixed Timing method and Current Sense method mitigate this particular problem by starting both parallel converters as diode output converters, which can be accomplished by disabling synchronous rectifiers in each converter during initial start-up phase, and then enable them at some time later. Both prior-art methods, however, have some serious disadvantages, which are highlighted, in a later separate Section, comparing relative merits of these methods with the Voltage Sense method of present invention.

However, neither of the two prior-art methods and circuit implementations is capable to solve another even more serious problem, which occurs during the start-up of a large class of switching converters: excessive voltage stress of input switching devices during start-up, which exceeds the voltage stress during their steady state operation (after start-up has been completed) by many times, as high as a factor of 10 times for certain operating conditions. The most surprising, however, is that this problem was not even recognized in the past. Thus, this problem is here, due to lack of accepted terminology, termed here the blow-up problem. This blow-up problem occurs in a number of basic isolated converters. The most popular representative of that class is forward converter with the voltage clamp, but the problem is also present in a number of other switching converters with two synchronous rectifiers on the output. It is rather striking that this problem until now was completely ignored and not even recognized as such. The reason for this may be that it occurs in a limited class of switching converters and then it is most pronounced under the special operating condition when the converter is designed for extremely low output voltages, such as 1.8V example. In other words, the lower the output voltage, the more pronounced is the problem.

In a separate section introducing this blow-up problem, it is shown how in the isolated Ćuk converter with a single synchronous rectifier on the output this problem does not occur. As a comparison, the popular forward converter with voltage clamp and with two synchronous rectifiers on the output and operating under the same operating conditions as the Ćuk converter (36V to 72V input voltage and 1.8V output voltage), is shown to experience a severe blow-up problem, with input switch having 972V voltage stress with synchronous rectifiers disabled, versus 108V voltage stress with synchronous rectifier enabled. This evidently well justifies the name given to this newly discovered phenomena, the blow-up problem, since the input switch will indeed fail when exposed during the start-up operation to the voltage stress nine (91) times the voltage stress under same operating conditions in the steady-state, when synchronous rectifiers are enabled.

Clearly, prior-art methods and circuit implementations are not equipped to prevent such catastrophic conditions. Thus the new methods and circuit implementations are needed to both address the two critical problems during the start-up:

1. Excessive voltage stress on input switching devices;
2. Excessive reverse DC current stress on the converter modules.

Both of these problems are effectively eliminated by use of the novel voltage sensing method and its circuit implementation, which by use of just a few signal processing devices, simulates the conditions needed to determine the optimum time to enable synchronous rectifiers.

The final section in a step-by-step process introduces a number of alternative circuit implementations of the new Voltage Sense method, from the most complex and easiest to understand to the simplest circuit implementations, which still preserve all the advantages and features of the new method.

Start-Up Operation of Paralleled Converters With Diode Outputs

First we analyze the operation of the two switching converters operated in parallel so that they are powered from the common source and deliver the power to the common load as shown in FIG. 1. The basic buck converter is chosen as an example, although the described analysis of its operation during start-up is equally applicable to other switching converter types with diode outputs. An alternative term for switching converters with diode outputs used throughout text and in figures is Current Uni-Directional (CUD) converter, while for converters with synchronous rectifiers, an alternative and more general term Current Bi-Directional (CBD) converters is used.

Figure 29:
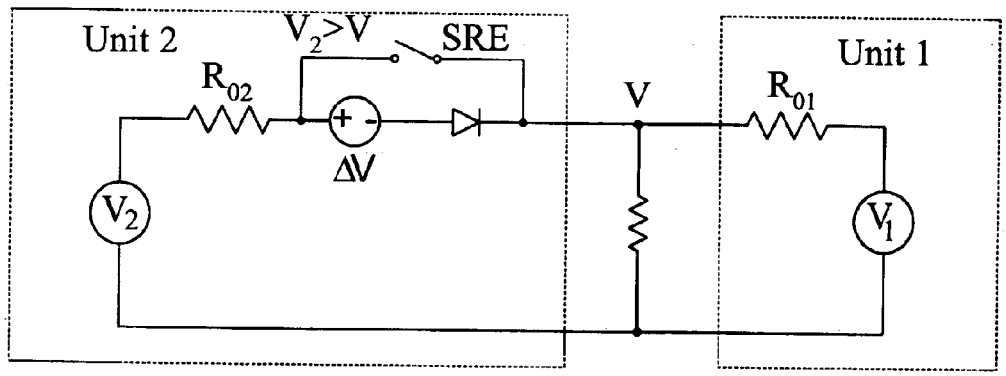
FIG. 29 Circuit model of the Voltage Sense Method of start-up of parallel converters with synchronous rectifiers and/or CBS switches.

First we examine how any two converters with Diode outputs can be paralleled and in particular how to predict their behavior during initial soft-start phase of converter operation. To investigate their parallel operation, each converter is represented by an equivalent circuit model consisting of a voltage source in series with the resistance, which is known as the Thevenin equivalent circuit model and is as shown in FIG. 29. With such equivalent representation the analysis of the operation of the complete circuit is much simplified, and yet the operation of the remaining original circuit attached to the Thevenin equivalent representation is not altered, hence use of name equivalent. In our example, the studying of the currents delivered by each converter is what is needed. Thus, replacing each converter with its equivalent circuit representation "looking into" the output terminals preserves complete understanding of the load current effects. In fact, Thevenin voltage source could be measured to be equal to the output voltage when there is no load resistance attached (open-circuit voltage). The resistances $R_{O1}$ and $R_{O2}$ are, in fact, the output resistances of the converters, which could be also measured at the output terminals. In a good voltage regulator they are very small and on the order of several milliohms. Note also that this linear circuit representation with Thevenin equivalent is also augmented with addition of an ideal diode (diode which acts as ideal rectifier with zero voltage drop when conducting) in each output to signify the fact that the reverse current flow is not possible in this case of the converters with diode outputs.

In the following example, both converters are rated at 5V, 20 A output with overload current limit at 24 A. The common load resistance R is 0.15 Ω, which can draw 33.3 A at 5V, almost 70% more than nominal 20 A current of a single unit.

Due to the components tolerances in control circuitry of each converter, two converters cannot start at exactly the same time and thus cannot have identical soft-start output voltage characteristics. Hence, the real life condition is that one converter always starts before the other one and reaches its output current limit or voltage limit at different time than the other one.

Figure 2A:
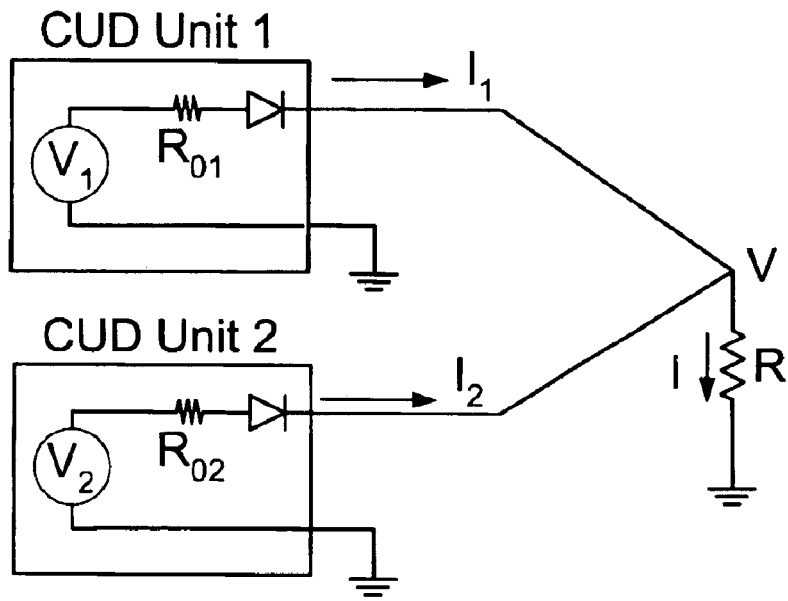
FIG. 2a illustrates the circuit models of the parallel converters of FIG. 1.
Figure 2B:
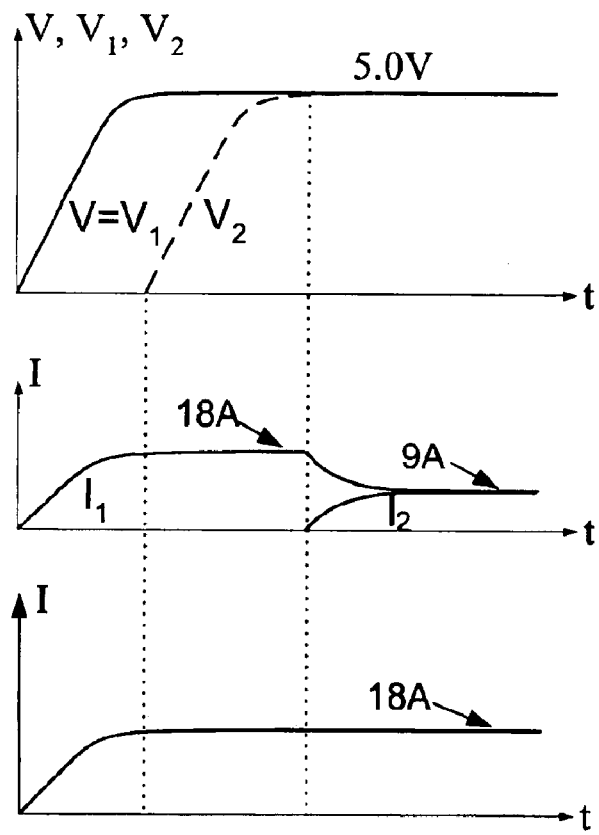
FIG. 2b illustrates the characteristic voltage and current waveforms during the start-up of converter in FIG. 1 and for light load current, so that current limit is not activated

Let us assume that Unit 1 converter starts first. We will first analyze a simpler case of the light load condition in which the current limit characteristic of either converter does not affect the behavior of parallel operation. In the case when the total load current is below nominal current of a single unit (light load condition), the converter which starts first, provides full current of 18 A at nominal output voltage of 5V, since its current limit is not activated and results in the waveform of equivalent Thevenin voltage source $V_1$ of Unit 1 in FIG. 2b. When Unit 2 starts, it does not provide the current to the load until the equivalent voltage $V_2$ of Unit 2 shown in doted lines in waveforms of FIG. 2b reaches 5V and equals with output voltage of Unit 1 so that both units could from that point start to share the load current. During the start-up the output voltage V follows first the internal equivalent Thevenin voltage source $V_1$ of the Unit 1, which started first. Note how the load current I during the start-up always equals the sum of the currents $I_1$ and $I_2$ delivered by each converter respectively. In case some additional feedback control strategy is implemented such as current-mode programming, equal current sharing between the two converters for any load current in steady-state could be accomplished.

The parallel operation is somewhat more complex in the case of the full load current when current limiting characteristic begins to alter the previously described behavior. When the each converter is designed with the constant voltage, constant current characteristic, after the current limit is reached, the converter output voltage will start dropping, but its output current will be maintained at the current limit level.

Figure 3A:
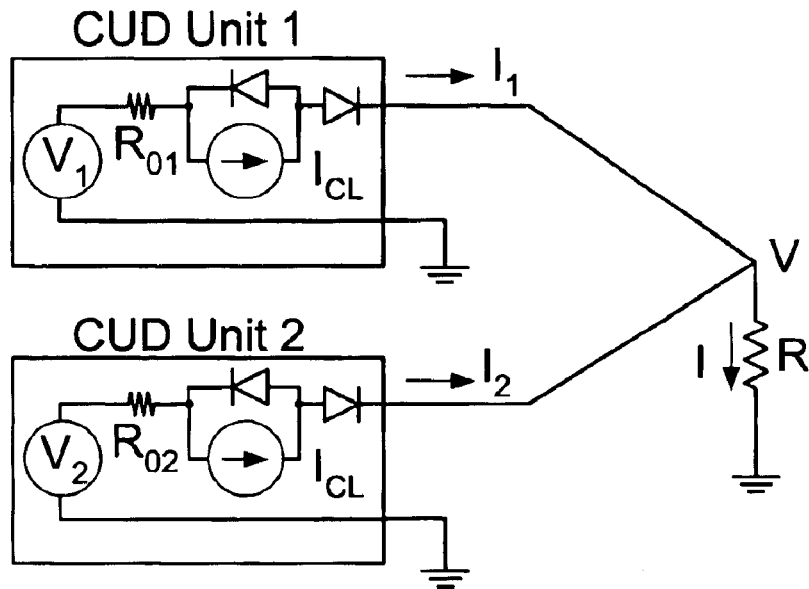
FIG. 3a illustrates the circuit model of the parallel converters of FIG. 1, which includes the model for current-limiting operation.
Figure 3B:
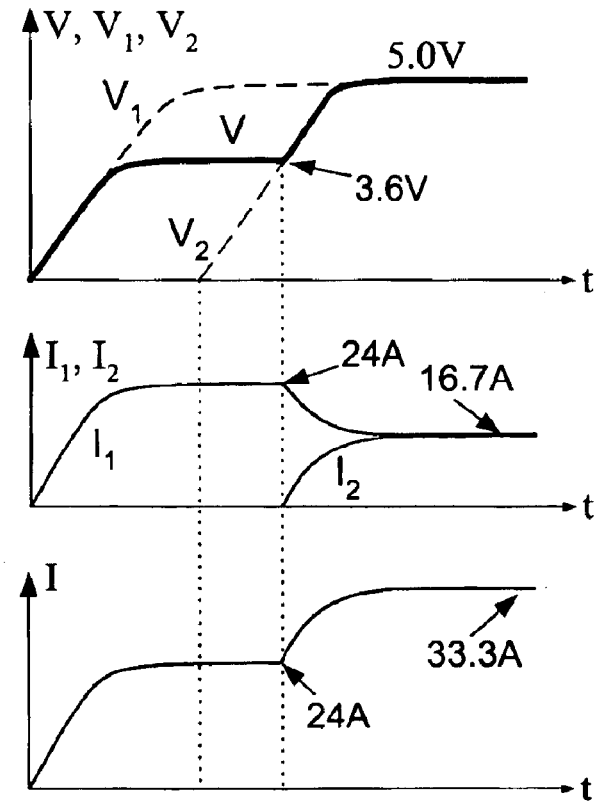
FIG. 3b illustrates the characteristic voltage and current waveforms during the start-up of converter in FIG. 1 but for heavier load currents with current-limiting circuit activated.

Note that the equivalent circuit model for each converter now has an additional current limit source $I_{CL}$ of 24 A as displayed in the models in FIG. 3a. In the numerical example given earlier, when output voltage of Unit 1 reaches 3.6V, the load current is 24 A, which activates the overload limit of the first converter and keeps the output voltage at 3.6V (shown with waveform $V=V_1$ in FIG. 3b before Unit 2 starts. When Unit 2 starts, it does not provide the current to the load until its equivalent voltage $V_2$ reaches 3.6V and equals the equivalent voltage $V_1$ of Unit 1. From that moment on, Unit 2 starts also to provide current to the load reducing current demand from Unit 1, which releases overload limit of Unit 1 and allows output voltage to gradually increase to regulated 5.0V. In FIG. 3a waveforms $V_1$ and $V_2$ are shown with the dotted lines, while the output voltage waveform is shown with the heavy line.

By the time both converters reach the 5V output voltage, the output current of Unit 1 has been reduced from 24 A to 16.7 A and output current from Unit 2 increased from 0 to 16.7 A so that both units work in parallel and equally share the full load current of 33.3 A. Once again this equal sharing of the load current in the steady-state must be assured by some other control means, since it is not automatic.

Figure 4A:
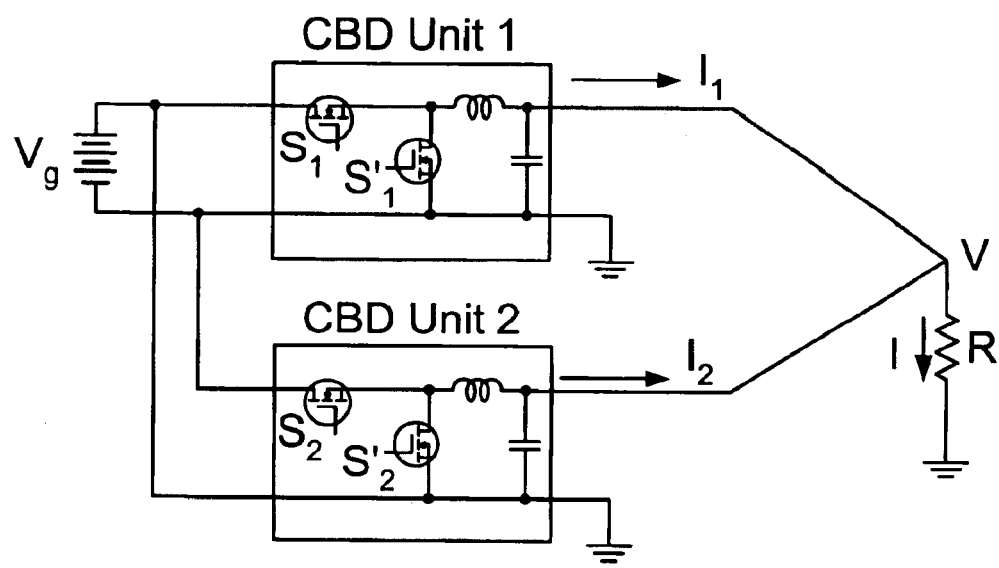
FIG. 4a illustrates parallel operation of two buck-type switching converters with synchronous rectifiers.

Problem of Parallel Operation of Switching Converters with Synchronous Rectifier Outputs at Start-up The output diodes in the buck converters of FIG. 1 are now replaced with the synchronous rectifier MOSFET to result in the paralleled converters with synchronous rectifiers of the buck type as shown in FIG. 4a. The synchronous rectifiers are used in the output stages of many DC-to-DC converters with low output voltage to increase the overall efficiency. A converter with synchronous rectifier at the output is normally current bi-directional since synchronous rectifier (such as MOSFET) is a current bi-directional switching device, which allows current flow in either direction. Thus, the power can flow in each converter either from the input to the output or from the output to the input. As a consequence of that bi-directional power flow, if two or more such converters with synchronous rectifiers are connected in parallel, this poses a special problem during the start-up process, which was not present in switching converters with diode outputs.

Figure 4B:
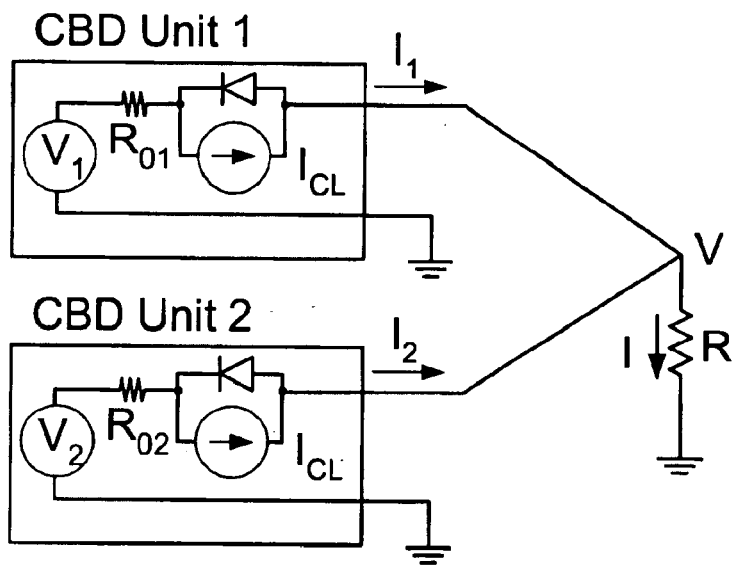
FIG. 4b illustrates the circuit model of the converters in FIG. 4a, which includes model of the current-limiting operation.

Each Current Bi-Directional converter (Unit 1 and Unit 2) is now represented with a Thevenin equivalent circuit model as shown in FIG. 4b. Since both for the light load example and for full load example, the current limit of 24 A is reached, the same model with current limit is used for each case. Note also the absence of the forward diode in the model, since the converter is current bi-directional and current flow in either direction is permissible.

In the following example, two converters are again rated at 5V, 20 A output with overload limit at 24 A. The common load resistance R is 0.15 Ω, which can draw 33.3 A at 5V, almost 70% more than nominal current of a single unit.

As in the case with diode-output converters, due to the components tolerances in circuitry of each converter, converters cannot start at exactly the same time and have identical soft-start output voltage characteristics. Hence, in practice, one converter always starts before the other one and reaches its output set-up current or voltage limitations at different time than the other one.

Figure 5A:
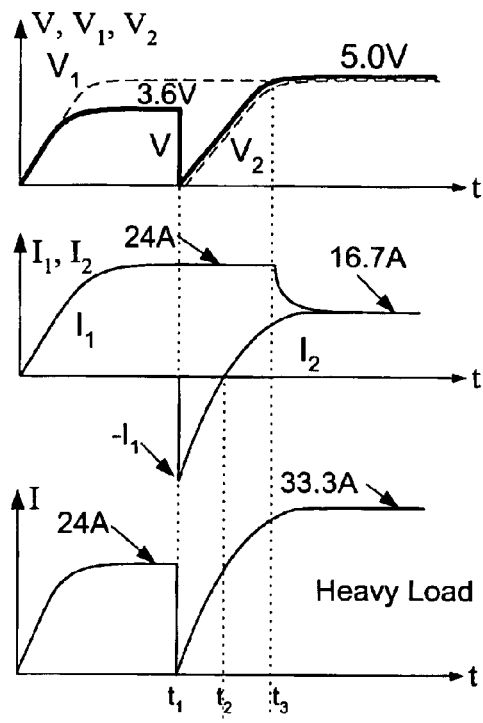
FIG. 5a illustrates the characteristic voltage and current waveforms during the start-up of the converter in FIG. 4a under the heavy load current conditions.

First the full load operation during the start-up is analyzed and salient waveforms shown in FIG. 5a. Note that if Unit 2 were to start separately (not in parallel with Unit 1), its soft-start circuitry would start increasing the output voltage form initial zero value gradually to its final steady-state output voltage. However, if Unit 2 were to start in parallel with Unit 1 connected and starting first, the operation proceeds differently. The Unit 1 will after start reach its current limit of 24 A, which for 0.15 Ohm load resistor results in 3.6V output voltage. Thus, when Unit 2 is connected in parallel and attempts soft-start it will actually face 3.6V voltage on output terminals and not near zero voltage if Unit 2 were running independently and not in parallel. Soft start of Unit 2 will then force output voltage to zero since Unit 1 in current limiting mode can adjust to practically zero output voltage. The reduction of output voltage to nearly zero results in practically near zero load current. The question then becomes: where does 24 A current limit of Unit 1 flow? At the moment when Unit 2 starts, the 24 A output current from Unit 1 actually flows backward into the output terminal of Unit 2. This is possible since Unit 2 is current bi-directional and allows for the reverse current flow.

As a result, Unit 2 is exposed to a tremendous stress at turn-ON. Instead of starting at ideally zero or very small current in positive direction, it is forced to conduct total 24 A current of Unit 1. Worse yet, Unit 2 is forced to conduct this current in the reverse direction for which the converter is not designed. Hence, the load current I, which is the sum of the two converter currents $I_1$ and $I_2$, from near zero value at turn-On of Unit 2 starts to increase with the increase of output voltage simultaneously with the decrease of the reverse current in Unit 2 until this current reaches zero at time $t_2$, reducing circulating current to zero. From this point on, as seen in waveforms of FIG. 5a, the Unit 2 starts delivering only positive current as also seen in $I_2$ waveform of FIG. 5a. When output voltage of Unit 2 reaches 5V, current limit of Unit 1 is released so the output current from Unit 1 decreases until it equalizes at 16.7 A with output current of Unit 2 to equally share the total load current of 33.3 A. The equal sharing of the load current after start-up has been completed in the steady-state regime is provided by additional external conventional control means not discussed here.

Clearly the above operating conditions during start-up cause several serious problems. First, a large glitch in the output voltage is created during start-up (abrupt change of output voltage from 3.6V to zero in above example). Second, even more severe problem which can cause catastrophic failure of the converter during start-up is also present when more than two converters are operating in parallel. For example, with five converters operating in parallel, the converter which starts last will have to conduct reverse current whose magnitude is sum of currents of all four converters, or 96 A. It is easy to see how this converter will fail when it is designed to only take 24 A limited current in positive direction and not 96 A current in reverse (negative) direction. Thus, circuit measures must be implemented to eliminate both problems.

Figure 5B:
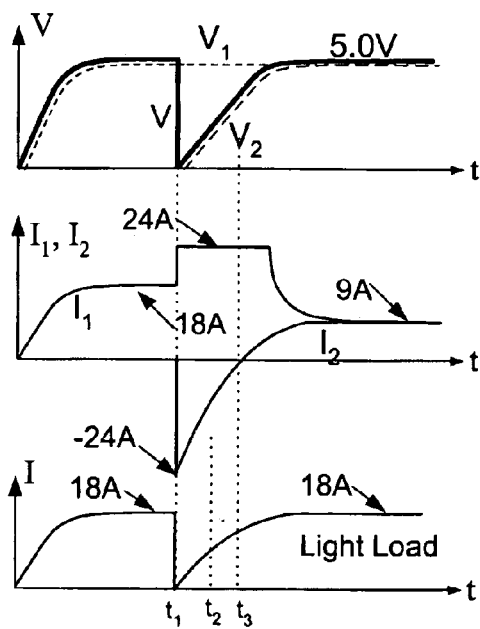
FIG. 5b illustrates the characteristic voltage and current waveforms under the light load current conditions.

Next the light load condition is analyzed. In this case the load current is below nominal current of a single unit (light load condition). Operation is similar, except that converter which starts first, provides full current at nominal output voltage of 5V, since its current limit is not activated (FIG. 5b). When Unit 2 starts, output voltage of Unit 1 controlled by the current limit circuitry drops to almost zero to provide 24 A limited current to Unit 2. Hence, the load current is practically zero and starts to increase with increase of the output voltages of Unit 1 and Unit 2 while the major current circulates from Unit 1 to Unit 2. When output voltage of Unit 2 approaches 5V, current limit of Unit 1 is released so the output current from Unit 1 decreases until equalizes with output current of Unit 2 when both units reached the nominal 5V output voltage and equally share the total load current. The separate circuitry is used to share the load current after the units have already started-up in parallel and since it is not subject of this invention it is not included here.

It should be mentioned here that this "glitch" in the output voltage of the converter, which at one instant reduces the output voltage to zero, although undesirable, might be tolerated if only the start-up of parallel converters is needed. In that case, the "power good" signal to the load could be delayed until all converters have successfully started. However, in many applications, paralleled converters are also used to increase reliability and to provide fault tolerances and redundancy in the system. Thus, if one unit fails, other takes over and warning is given that failed unit needs to be replaced. Typically, it is required that the failed unit be replaced "hot", that is without shutting down the whole system. In that case, such a "glitch" in output voltage due to bringing onboard the replacement unit, would bring down the output voltage to zero and cause the entire system to crash and shut-down. Therefore, elimination of such an extreme voltage "glitch" in the output voltage is very desirable since it clearly extends the range of applications. Present invention will not only eliminate the drastic voltage reduction to zero, but furthermore eliminate any glitch in the output voltage during start-up or "hot-plugging".

Solution for Converters with A Single Synchronous Rectifier Switch

Figure 6A:
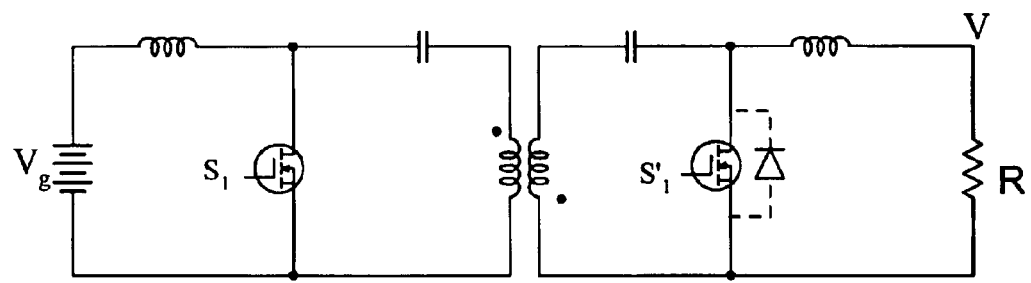
FIG. 6a illustrates the prior-art isolated Ćuk converter.

The startup problem and the prior-art solution for paralleled converters with synchronous rectifiers outputs are discussed here on an example of the isolated Ćuk converter shown on FIG. 6a with synchronous rectifiers. The Ćuk converter like a number of other basic isolated converters, such as isolated flyback converter and isolated SEPIC converter have a single switch on the secondary side hence only one output rectifier switch. Thus, the synchronous rectifier version of FIG. 6a has single synchronous rectifier on output secondary side and corresponding additional duty ratio control of synchronous rectifier switch S'. Therefore, when the pulsed drive signal (duty ratio control) of the output MOSFET switch S' is disabled (drive not applied to the gate of synchronous rectifier output MOSFET switch), the internal body-diode of synchronous rectifier switch is operating as a unidirectional switch. Thus, the converter would operate as though it was implemented with a diode rectifier on output. The diode prevents the reverse current flow and eliminates corresponding start-up problems. The prior-art Fixed Timing method outlined below disables synchronous rectifier switch during start-up and avoids the start-up problem but its usefulness is limited to converters with only single synchronous rectifier switch on output.

However, there is a large number of other fundamental isolated switching converters belonging to a class of converters which two synchronous rectifier switches on the secondary side. The popular forward converter, and all bridge type converters, for example, belong to this class, such as full-bridge, half-bridge, and push-pull converters in either center-tapped secondary (full-wave rectification configuration), or in their half-wave rectification configuration, as well as their current-doubler and other variants. It turns out that the solution to the start-up problem is, in general considerably easier for converters with a single synchronous rectifier switch on the output, like a Ćuk converter, than for the converters with two synchronous rectifiers on the output. The addition of the Coupled-Inductors and Integrated Magnetics variants in converters with one or more synchronous rectifiers on output presents even more problems during the start-up of converters with synchronous rectifiers on output. The present invention introduces an effective, simple to implement, yet practical and reliable general method how to successfully parallel converters regardless of the number of synchronous rectifier switches and other converter complexities such as Integrated Magnetics and Coupled-Inductor variants.

Figure 6B:
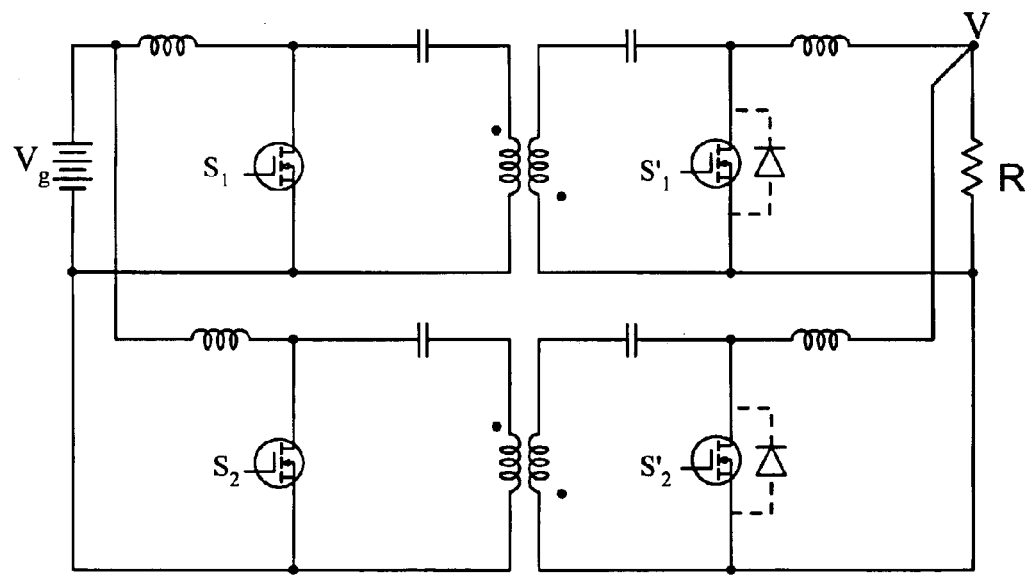
FIG. 6b illustrates the parallel connection of two prior-art Ćuk converters.

To understand better how the general solution to paralleling of the converters with the two synchronous rectifiers on the secondary side is provided with the present invention, the prior-art solution to the start-up problems with the converters with a single synchronous rectifier switch on the secondary side is analyzed in more details first. In this way, the unique problems of the converters with two synchronous rectifiers will surface and point toward understanding of the solution provided with this invention. As an example two Ćuk converters, each with a single output synchronous rectifier switch, are connected in parallel as shown in FIG. 6b. However, the following analysis of the prior-art solution applies equally well to other converters with the single secondary side synchronous rectifier switch.

Disabling of the Single Synchronous Rectifier Before and During the Start-up

The same problem as described in the background section exists in a single synchronous rectifier case. The synchronous rectifier switch on the output as well as input MOSFET make each converter current bi-directional allowing for the power flow to go backwards. As before one unit will start first. Let us say that Unit 1 will start first and reach nominal output voltage. If Unit 2 is now started up with the output synchronous rectifier $S_2$ of Unit 2 enabled, the Unit 1 will go into current limiting mode thus delivering that current to the Unit 2, while the output voltage will drop to zero and hence load current will become zero as well. Hence large dip in the output voltage and large reverse current stress of Unit 2 are the consequence.

Figure 7A:
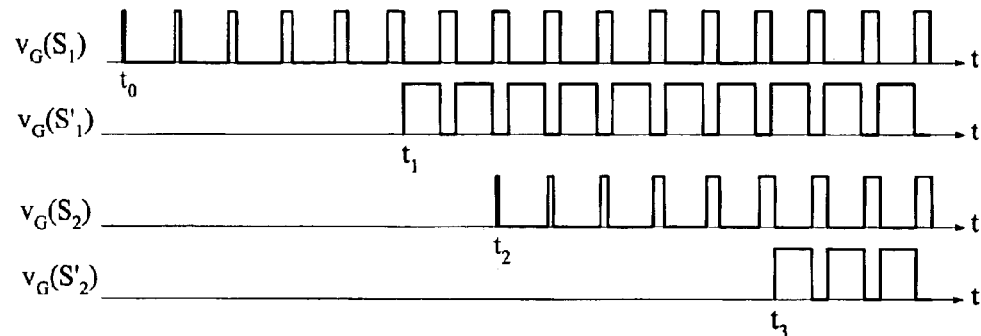
FIG. 7a illustrates the gate drive voltage waveforms for all four controllable switches of the paralleled converters in FIG. 6b during start-up. The synchronous rectifier of each unit is enabled after fixed delay from the time the respective converter has started.
Figure 7B:
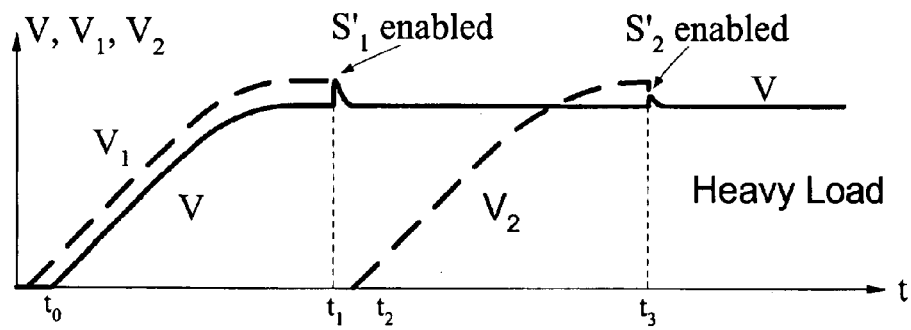
FIG. 7b illustrates the characteristic voltage and current waveforms of the converters in FIG. 7b during the start-up under the heavy load current condition.

Since we do not know, which of the two paralleled units will start first, the same could happen when Unit 2 has started first imposing stresses on Unit 1. Thus, the solution in this special case of a switching converter with a single secondary side rectifier is found in operating both converters of FIG. 6b initially with their synchronous rectifier switches $S_1'$ and $S_2'$ disabled, that is, with output body-diodes only, which prevents above mentioned reverse current flow of either unit. As explained in the background section, in this case, there is no start-up problem. One unit, for example Unit 1, will then start first and reach the nominal output voltage. The corresponding controlling gate drive signals of all four active switching devices are shown in FIG. 7a. Note that the primary side active switch $S_1$ is enabled at time to and its duty ratio is gradually increased in a soft-start manner. Notice, however, how the corresponding drive signal for synchronous rectifier $S_1'$ is disabled in the time interval between instants $t_0$ and $t_1$ during which period Unit 1 operates with output body-diode only and results in the gradual increase of the output voltage V until its nominal value is reached as seen in the voltage waveform in FIG. 7b representing the full load case. Then at instant $t_1$ the switching of synchronous rectifier of Unit 1 is enabled with drive signal $S_1'$ shown in FIG. 7a. This results in the upward glitch of the output voltage due to the following.

At full load, the body-diode of synchronous rectifier conducts (continuous conduction mode) and generates a voltage drop (typically around 0.8V), which reduces the output voltage by that voltage diode drop. When the synchronous rectifier $S_1'$ is enabled for the first time after start-up, it bypasses the body-diode and eliminates the body-diode voltage drop. This causes sudden increase in the output voltage. The feedback loop compensates by adjusting the duty ratio over a number of switching cycles to a new lower value, which corresponds to the synchronous rectifier switching. The ultimate result is the presence of the voltage overshoot at the output as shown on FIG. 7b at instant $t_1$.

Next the Unit 2 is soft-started in similar manner beginning at instant $t_2$ as seen by the drive signal $S_2$ in FIG. 7a to result in gradual increase of the internal equivalent Thevenin voltage source $V_2$ of Unit 2 until nominal output voltage is reached as shown by waveform with dotted lines in FIG. 7b. Once again, for a fixed time interval from instant $t_2$ until instant $t_3$, the drive for the synchronous rectifier of Unit 2, the signal $S_2'$, is disabled forcing the Unit 2 converter now to operate in the regime with output body-diode only.

Finally, at later instant $t_3$ the synchronous rectifier of Unit 2 is enabled as seen in waveform $S_2'$ of FIG. 7a. Once again, at that instant there is another upward glitch in the output voltage of the converter for the same reason as when synchronous rectifier of Unit 1 is enabled.

Note that the instants $t_1$ and $t_3$ are typically determined as some fixed time delay from the initiation of the main primary side switches $S_1$ and $S_2$ respectively. Thus, this method of control is termed Fixed Timing method.

Figure 7C:
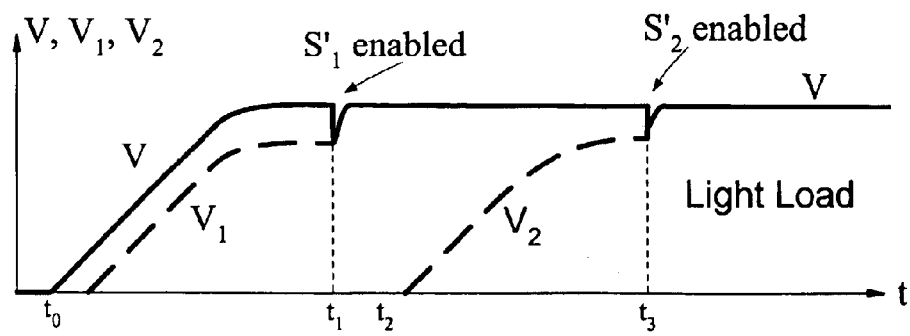
FIG. 7c illustrates the characteristic voltage and current waveforms during the startup under light load current conditions.

On the other hand, at very light loads, the body-diode of the synchronous rectifier $S_1'$ ceases to conduct and the converter operates in discontinuous conduction mode before the synchronous rectifier switching is enabled. In such mode of operation, the duty ratio may become significantly lower than during the nominal load operation. When the synchronous rectifier is enabled it will take a number of switching cycles for the control circuit to increase the duty ratio to its proper value (corresponding to continuous conduction mode output voltage) thus causing a downward glitch in the output voltage as shown on FIG. 7c illustrating the light load case.

Overshoot Elimination with Soft-start of Synchronous Rectifiers

Figure 8A:
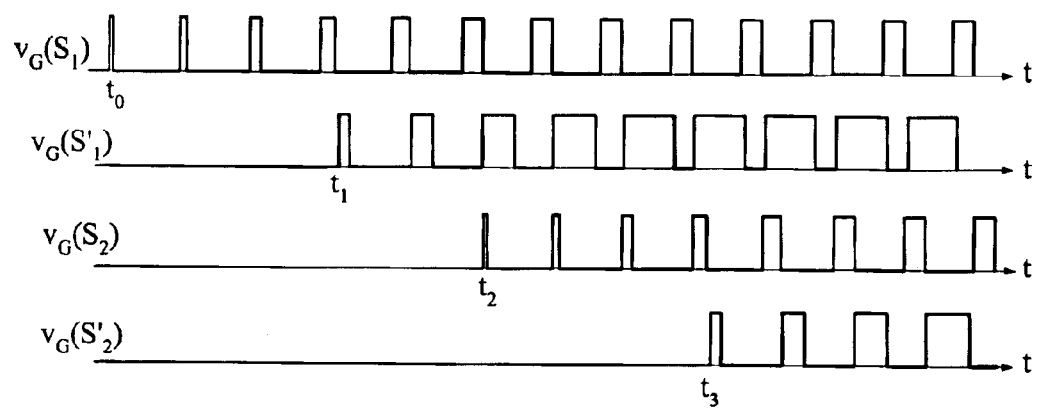
FIG. 8a illustrates how the secondary side synchronous rectifiers for the converters of FIG. 6b are soft-started.
Figure 8B:
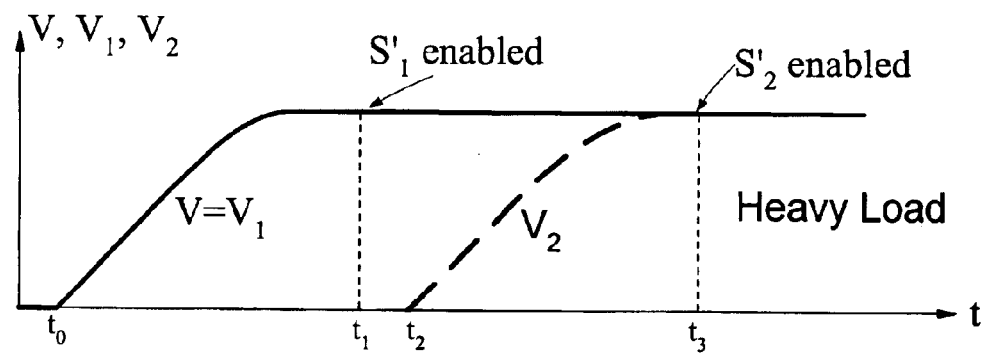
FIG. 8b illustrates how the voltage overshoots are eliminated from the output voltage when the soft-start of the synchronous rectifiers is implemented to the converters of FIG. 6b.

Clearly, the output voltage overshoots due to enabling of the synchronous rectifier switches as shown in FIG. 7b are undesirable and should be eliminated. This can be accomplished by implementing a more sophisticated drive signals for the synchronous rectifiers $S'_1$ and $S'_2$ as shown in the waveforms of FIG. 8a where each synchronous rectifier is also gradually increased from effectively zero complementary duty ratio to a full complementary duty ratio (1-D), much like the soft-start of the main primary side switches $S_1$ and $S_2$. Thus the proper name for this drive control is soft-start of synchronous rectifiers. This drive does have the positive effect of eliminating the voltage overshoots on the output voltage due to enabling of two synchronous rectifiers, as seen by the absence of the voltage glitches or spikes in the output voltage during start-up shown in FIG. 8b. Although this more complex drive did eliminate the overshoot in the output voltage, it did not reduce the increase of the voltage stress of the main primary side switches, which in some converter topologies can become by far a more serious problem then output DC voltage overshoot.

Both phenomena arise due to the output voltage reduction caused by the voltage drop on the body-diode relative to no such drop across synchronous rectifiers. Thus, the models used initially to explain start-up problems and solutions need to be refined to include the quantitative effect of the body-diode voltage drop on the output voltage as well as on the increased voltage stress on the primary side switches.

Refinement of the Equivalent Circuit Models

Figure 9A:
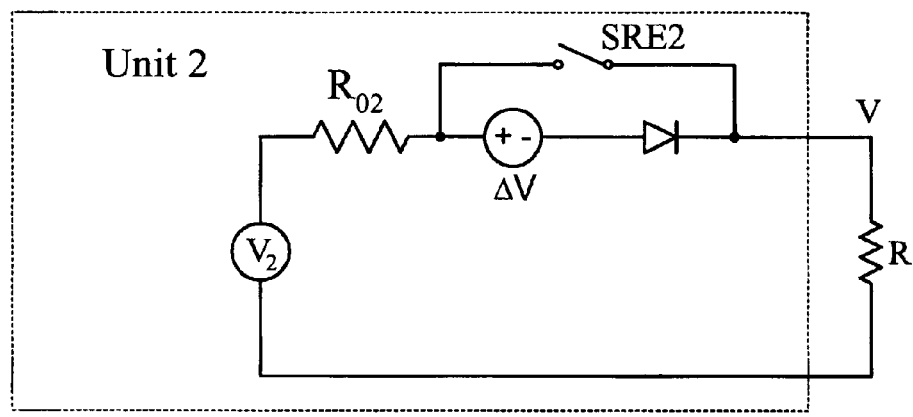
FIG. 9a illustrates the circuit model of Unit 2, which includes the effect of diode voltage drop and addition of Synchronous Rectifier Enable switch SRE 2. This model is applicable to converters with diodes (SRE 2 open) or with synchronous rectifiers (SRE2 closed).

The equivalent circuit models introduced so far need some refinement. First, the model for the switching converters with diode output did not account for the diode voltage drop. The diode voltage drop is therefore modeled by an additional voltage source $\Delta V$ in series with the Thevenin equivalent source as seen in FIG. 9a. Note that this voltage source measures how much the output voltage has been reduced in magnitude due to the presence of the voltage drop across the diode and is not necessarily equal to the voltage drop across the diode, but instead, the output voltage drop depends on the converter type. Previously the converter was either operating with the diodes or with the synchronous rectifier but not with both in different parts of the start-up period. In the just introduced start-up regime, the synchronous rectifier switch is first disabled to allow the converter to start with diode output and at certain later time $t_1$ the synchronous rectifier is enabled. Therefore during the start-up period, the operation is switched between two models: one with the diode used before (and now refined with voltage drop $\Delta V$), and one with the synchronous rectifier also used separately before. The two models are now merged into one by use of a separate synchronous rectifier enable (SRE) switch, as shown in the model of FIG. 9a for the Unit 2. Note that when this SRE 2 switch is closed, both voltage source $\Delta V$ and ideal diode are by-passed leading to the synchronous rectifier model. When SRE 2 switch is open, the model reverts back to the ideal diode model with voltage drop $\Delta V$.

One word of caution is appropriate here. The switching ON or OFF of the SRE2 switch in the model is not the same as turning ON or OFF of the synchronous rectifier MOSFET at the switching frequency in the real circuit. Turning ON switch SRE2 is actually enabling the switching action of the synchronous rectifier MOSFET on the output, so that it can bypass its own internal body-diode, while turning OFF of the SRE2 switch means disabling the synchronous rectifier MOSFET switching action, hence operation with only body-diode of the respective MOSFET. Clearly in the case discussed later for the converters with two output synchronous rectifiers, such as forward converter with voltage clamp of FIG. 10a this enabling and disabling action of SRE switch will apply to both synchronous rectifier switches.

How to engage these Synchronous Rectifier Enable (SRE) switches at an optimum time $t_{OPT}$ so that both of the above undesirable effects, the output voltage overshoots and increased voltage stresses of input switches, can be eliminated is the subject of the present invention. However, before the actual additional signal processing circuitry can be introduced, which implements the new method, in order to fully understand the new method, the refined circuit models are needed to quantify the problem at hand. These refined models are then followed up with the analysis of the effect of the output voltage drop due to diode voltage drops on the large increase of the voltage stress of the primary side switches during start-up in certain converter topologies designed for ultra low output voltages.

The glitch in the output voltage waveform due to the diode, the voltage drop $\Delta V$ is certainly undesirable since it causes voltage overshoot in the output waveforms. For example, some electronic loads (such as certain types of electronic memories can be even damaged if the voltage exceeds certain limits. In those applications nominal 5V output is not allowed to go over 6V (or sometimes even 5.5V). Some modern microprocessors operating on 1.8V, 2.5V, or 3.3V are extremely sensitive to any voltage overshoots and cannot tolerate even 0.1V voltage overshoot. Thus, it is important to know the actual magnitude of $\Delta V$, the effect of the output diode voltage drop $V_F$ on the reduction of the output voltage due to diode presence, and consequently, the overshoot "glitch" in the output voltage.

Output Voltage Reduction Due to Diode Voltage Drop

The real diodes can be modeled as the ideal diodes in series with the voltage source $V_F$, where $V_F$ is the forward voltage drop of the diode. Typical value of this voltage for rectifiers based on silicon technology, which is most widely used for present switching devices is 0.7V.

The output voltage of any converter V can be expressed in the following general way:

$$V = V_{SR} - \Delta V \tag{1}$$

where $V_{SR}$ is the ideal output voltage when synchronous rectifier is used to bypass the diode voltage drop and since we assume that synchronous rectifier voltage drop is negligible compared to diode voltage drop. Voltage $\Delta V$ is the voltage by which the ideal output voltage is reduced.

The analysis of the buck converter of FIG. 1 (volt-second balance on inductor) in the presence of diode forward voltage drop $V_F$ results in the following output equations:

$$V_{SR}=DV_g \quad (2)$$

$$\Delta V=(1-D)V_F \quad (3)$$

Note how in general degradation of output DC voltage due to diode voltage drop is function of both actual diode voltage drop $V_F$ and operating duty ratio D. Fortunately, in many popular converters it is independent of operating point and equal to $V_F$ as seen from the Table I listing $\Delta V$ for a number of basic converter types.

TABLE I

| Topology | Buck | Boost | Flyback | Ćuk | Forward | Forward with voltage clamp |
|---|---|---|---|---|---|---|
| ΔV | D'VF | $V_F$ | $V_F$ | $V_F$ | $V_F$ | $V_F$ |

From this, it appears that other than a minor glitch in output voltage, which is no worse in magnitude than the diode voltage drop $V_F$, no other major problems are caused by voltage diode drop. This is, however, not the case, as the next section demonstrates on the example of a popular prior-art forward converter with voltage clamp, when it is designed to operate at ultra low output voltages, such as 1.8V for example.

Blow-up Problem with Input Switches

Quite unexpectedly, the forward voltage drop of the diode, even though of the relatively little impact on the output DC voltage of the converter, can under certain circumstances, and for some widely used switching converter topologies, result in extremely high voltage stress of the input switching device during the start-up process, which far exceeds the voltage stress of the same devices in their steady-state regime operating with synchronous rectifiers. It is rather surprising that this problem with paralleling converters has not been observed at all up until now considering that this excessive voltage stress on input switches and potential blow-up problem are present in a number of widely used converters such as forward converter with voltage clamp (examined next). Another paradox is that the lower the output DC voltage for which the converter is designed the bigger the problem with excessive voltage overshoot of the input switches. After the detailed analysis here, however, such behavior will not any look like a paradox, but it should be expected.

Forward Converter with Voltage Clamp for Very Low Output Voltages

Figure 9B:
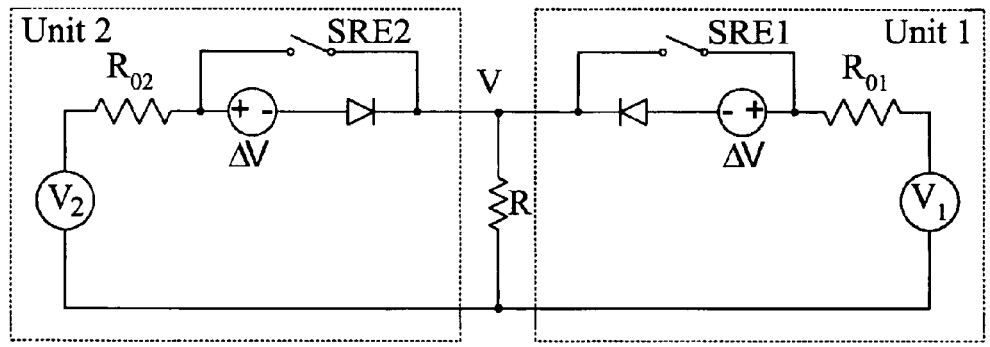
FIG. 9b illustrates the circuit model useful for analysis of two switching converters connected in parallel during their start-up operation.
Figure 10A:
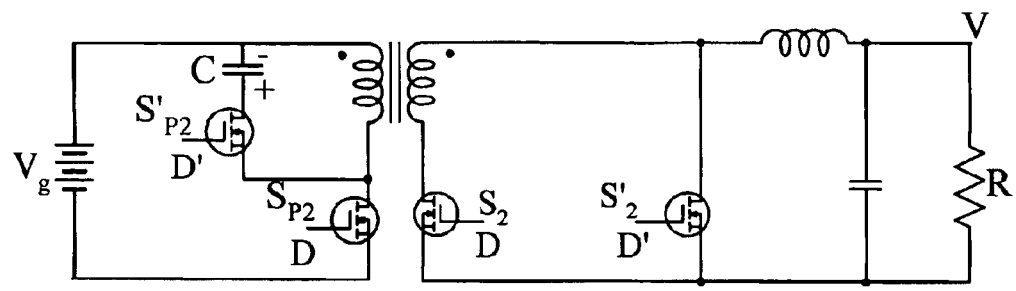
FIG. 10a is the prior-art forward converter with the voltage clamp.
Figure 10B:
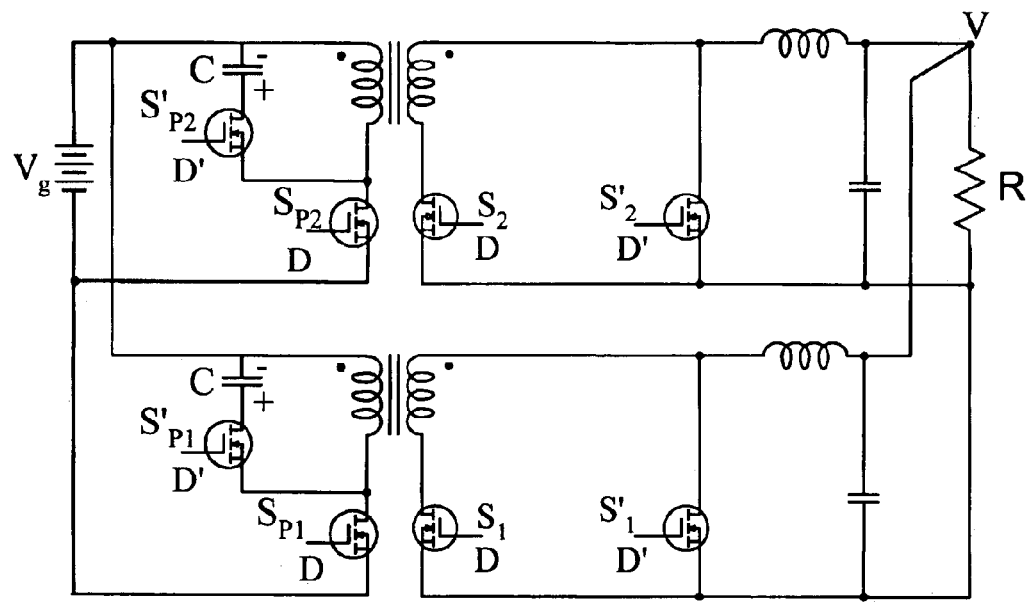
FIG. 10b illustrates the parallel operation of two forward converters with voltage clamps.

Forward converter with the voltage clamp is shown in FIG. 10a implemented with the synchronous rectifier, so that it can give highest efficiency at ultra low voltages, such as V=1.8V chosen for this example. Two forward converters operated in parallel are shown in FIG. 10b. The same equivalent circuit model as used for paralleled Ćuk converter of FIG. 6a and FIG. 6b and shown in FIG. 9a and FIG. 9b can also be used for forward converter and other converters with two or more synchronous rectifiers on the output. It can be, however, shown that due to the two synchronous rectifier configurations and the presence of the output inductor (and its possible coupling to the transformer in some converter variants), the "soft-starting" of the synchronous rectifiers as it was disclosed for the Ćuk converter and other converters with a single synchronous rectifier in the output cannot be implemented for the following reason. If there is any dead-time between the two devices, which is required for soft-starting synchronous rectifiers, and the inductor current ripple is negative, this condition will cause huge voltage spikes, which would damage the synchronous rectifiers. Thus, an alternative method is needed which is inherently suitable for converters with two or more synchronous rectifiers on the output secondary side. However, the new Voltage Sense method does have the same starting objective: both forward converters should be started initially operating with the body-diodes conducting and then switched onto operation with synchronous rectifiers at a later time.

For illustration purposes, a forward converter is designed for a typical input voltage range of 36V to 72V. This problem would actually get progressively worse if wide input voltage range such as 1:4 range were chosen and not 1:2 as here. The nominal input voltage of $V_g$=48V will result at duty ratio of 0.5 and transformer turns ratio of n=13.33 in a desired regulated output voltage of V=1.8V, which is typical voltage required of modern power supplies powering latest microprocessors.

Diode voltage drop of $V_F$=0.8V is also assumed, which is typical voltage drop of practical high power diodes. Note that in this practical example, the diode voltage drop represents the significant percentage of the total output DC voltage (approximately 44%), hence the observed effect will be significant.

First we calculate the stress levels under the steady-state conditions when both paralleled forward converters of FIG. 10b are operating with their synchronous rectifiers enabled. With the synchronous rectifiers enabled, the duty ratio for 48V input is confirmed to be 0.5 as per:

$$D=nV/V_g=0.5 \quad (4)$$

The voltage stress on the main switch is given by:

$$V_{DS}=V_g/(1-D)=96V \quad (5)$$

With synchronous rectifier still enabled, but for 36V input voltage duty ratio is:

$$D=nV/V_g=0.667 \quad (6)$$

for which the voltage stress on the main switch is given by:

$$V_{DS}=V_g/(1-D)=108V \quad (7)$$

Let us now assume that for the purpose of start-up operation at 36V input, the synchronous rectifiers are disabled, which will result in the much increased duty ratio. From the circuit model of FIG. 9a internal Thevenin voltage of 2.6V (instead of previous 1.8V) must be generated so that after 0.8V output voltage drop due to diode is accounted for, the nominal 1.8V output voltage is still obtained. Hence, the converter through the feedback loop must increase duty ratio to 0.963 as per:

$$D=n(V+V_F)/V_g=0.963 \quad (8)$$

For this duty ratio, the voltage stress on the main switch is given by:

$$V_{DS}=V_g/(1-D)=972V \quad (9)$$

From (7) and (9), one can observe that for the same input voltage of 36V, the diode operation (used only during start-up) results in nine times higher stress voltage than for synchronous rectifiers used after start-up is completed, justifying the name blow-up problem. Clearly, this is totally unacceptable in practice and some method must be devised to either reduce or completely eliminate this excessive main switch over-voltage stress. The above extreme conditions could be somewhat reduced, if the nominal operating point for 48V input were to be moved bellow 0.5 duty ratio. Nevertheless, the resulting stress levels would still be unacceptable in practice.

Figure 11A:
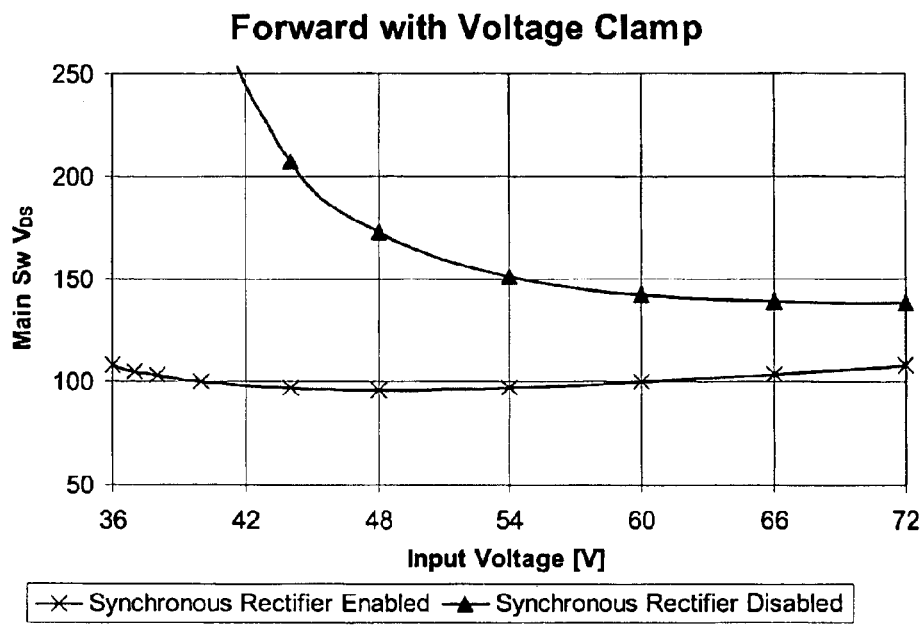
FIG. 11a illustrates the tremendous increase of the voltage stress of the primary side switches of the forward converter in FIG. 10a when its operation is changed from synchronous rectifier to diode outputs during the start-up.
Figure 11B:
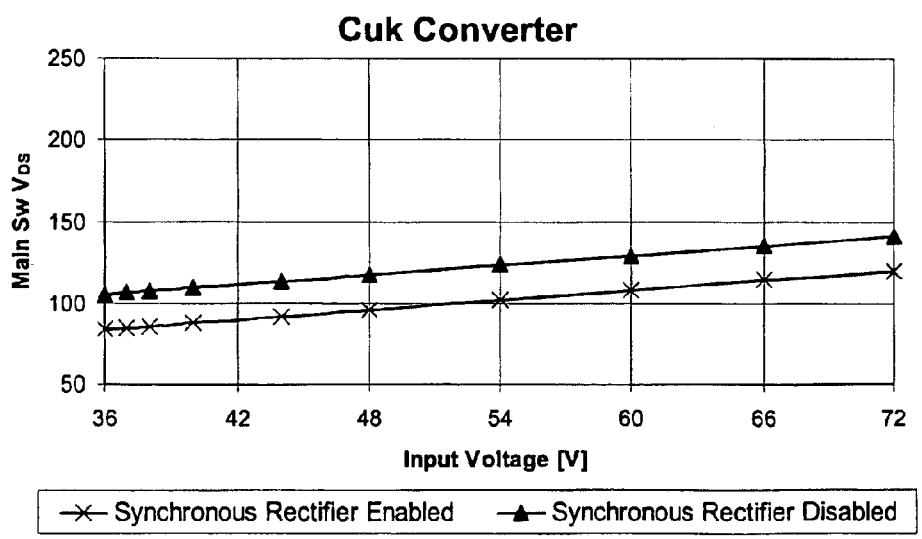

The complete data for the forward converter with voltage clamp and for whole input voltage range are shown in Table II. Table II also includes the corresponding data for the Ćuk converter. Surprisingly, no such blow-up problem is observed in the Ćuk converter. Nevertheless the same problem does appear in a number of other widely used converter topologies. Table II data are also displayed in graphical forms in FIG. 11a for forward converter with voltage clamp. Shown are voltage stress levels over the whole input range for operation under synchronous rectifier output displaying almost constant voltage stresses over the full voltage range and under disabled synchronous rectifier (diode) output clearly illustrating the pending excessive voltage stresses at low input voltages. FIG. 11b for Ćuk converter also in a graphical form displays only a very slight voltage stress increase under diode operation and absence of the blow-up problem.

Figure 12:
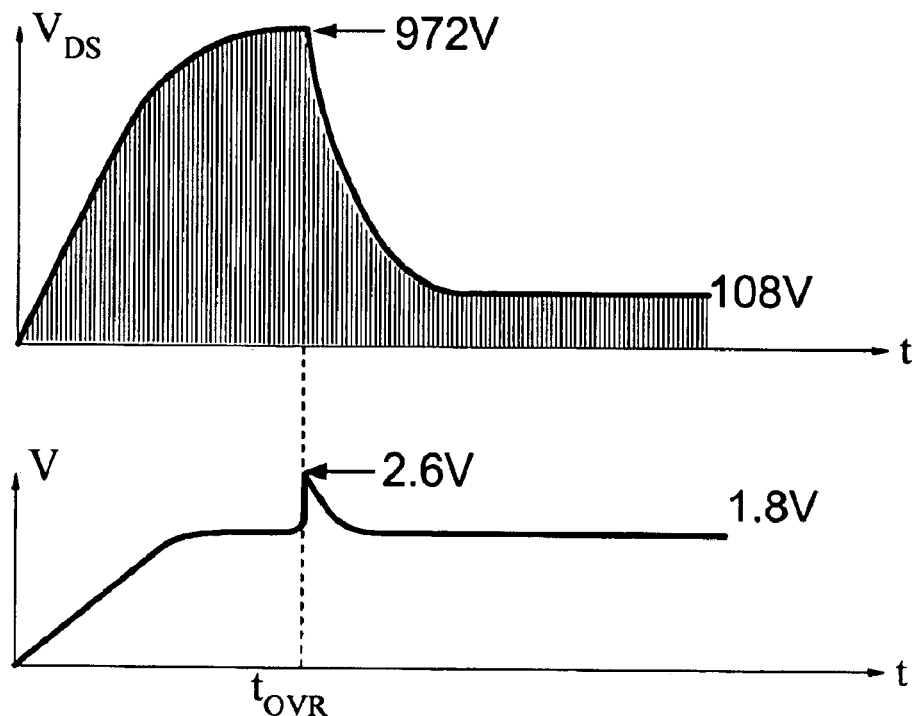
FIG. 12 illustrates the excessive drain-to-source voltage of the main primary side switch in the forward converter of FIG. 10a during the start-up operation with the diode rectifiers and the output voltage overshoot at instant $t_{OVR}$ when synchronous rectifiers are enabled.

The main switch voltage stresses for the same forward converter example at 36V input voltage are also shown simulated over a number of switching cycles during the start-up process and displayed in FIG. 12 once again displaying maximum voltage stress of 972V when the synchronous rectifiers are enabled at instant $t_{OVR}$ indicating peak overshoot. Furthermore, the output voltage overshoot of 0.8V occurring at instant $t_{OVR}$ when the synchronous rectifiers are enabled is also displayed.

TABLE II

|  | Ćuk Converter | | | Forward Converter with Voltage Clamp | | |
| --- | --- | --- | --- | --- | --- | --- |
| Input voltage [V] | 36 | 48 | 72 | 36 | 48 | 72 |
| | Synchronous Rectifier Enabled | | | | | |
| Duty Ratio [1] | 0.571 | 0.500 | 0.400 | 0.666 | 0.500 | 0.333 |
| Voltage Stress [V] | 84 | 96 | 120 | 108 | 96 | 108 |
| | Synchronous Rectifier Disabled | | | | | |
| Duty Ratio [1] | 0.658 | 0.591 | 0.491 | 0.963 | 0.722 | 0.481 |
| Voltage Stress [V] | 105 | 117 | 141 | <u>972</u> | 173 | 139 |

Conceptual Solution to Voltage Stress Problem

The problem apparently occurred due to the converter being forced to high duty ratio of 0.963 in order to compensate for the diode voltage drop and the fact that voltage regulation is maintained throughout the process. The voltage stress increase could be apparently completely eliminated if the converter for 36V input could be made to operate at the same duty ratio of 0.66 with the diode output as it did operate with synchronous rectifiers. Then, there would be no need to change duty ratio and the same voltage stresses will be present before and after synchronous rectifiers are enabled. From circuit model in FIG. 9a this means that when SRE 2 switch is enabled (synchronous rectifier operation), the internal Thevenin voltage source must be $V_2=V=1.8V$. On the other hand when SRE 2 is disabled this would result in output voltage with diodes $V_D=V_2-V_F=1.0V$. This, of course, should be possible, since during start-up internal voltage $V_2$ as well as output voltage V are gradually increasing due to soft-start circuitry from zero volts upward. Hence the soft-start should be allowed to proceed only up to the instant when output voltage reaches 1.0V and not 1.8V. If at that instant, synchronous rectifier is enabled, since the diodes are by-passed, the output voltage will jump by 0.8V to 10.8V output and stay there.

Figure 13:
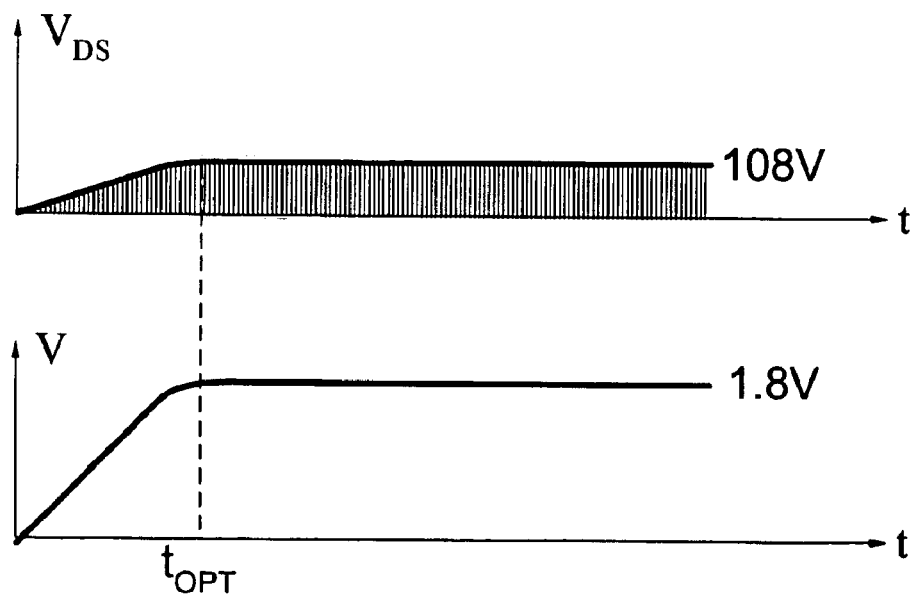
FIG. 13 illustrates the elimination of any excess voltage stress of primary side switches of the forward converter of FIG. 10a and elimination of any voltage overshoots in output voltage when the Voltage Sense method and enabling control circuitry of present invention is applied during the start-up of two converters of FIG. 10b.

This, of course, means that the switch-over and enabling of the synchronous rectifier should take place much earlier than instant $t_{OVR}$ corresponding to 0.963 duty ratio and 1.8V with the diode outputs, but instead, at some earlier instant in the start-up process $t_{OPT}$ when the output voltage with diode outputs reaches only the voltage of $(V-V_F)=1.0V$. At that instant, internal Thevenin voltage source $V_2$ has reached the desired regulated output voltage value V or 1.8V. Thus, if the switching converter was soft-started started with diode output and then synchronous rectification enabled at specific instant $t_{OPT}$ when actual output has reached 1.0V (and not 1.8V), the output voltage will jump to desired 1.8V and same duty ratio of 0.66 reached at that time will be maintained. Thus, there will be no increase in the voltage stresses on input switches above their stresses in the steady-state as illustrated in FIG. 13. Furthermore, the voltage overshoot in the output voltage is also eliminated. Both of these performance improvements are confirmed later in the experimental section when the method of present invention and its circuit realization were implemented.

Figure 14A:
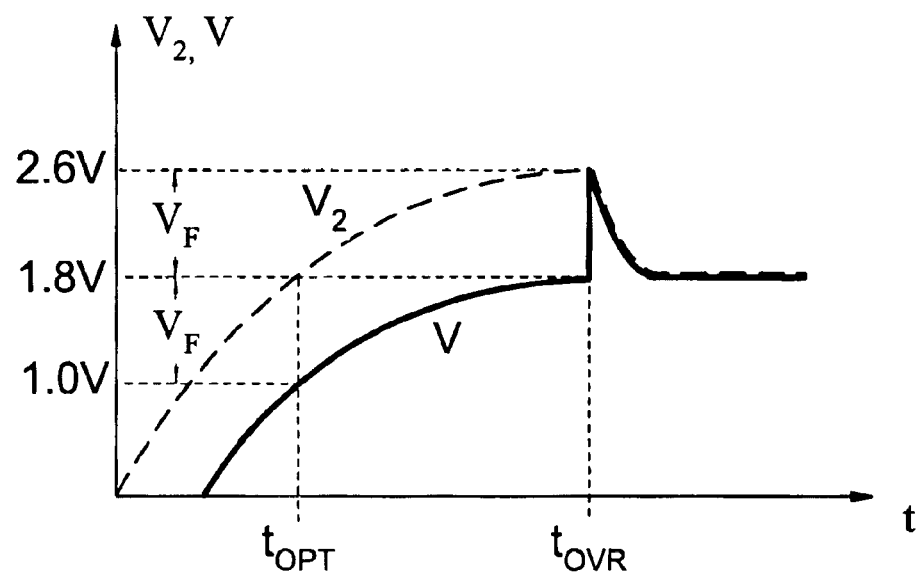
FIG. 14a illustrates characteristic waveforms in the conventional start-up approach using Fixed Timing control method in which the output voltage V is allowed to reach its final 1.8V value operating on diode rectifiers until instant $t_{OVR}$ when synchronous rectifiers are enabled resulting in output voltage V overshoot.

In the conventional start-up approach such Fixed Timing method is shown in FIG. 14a, the converter operates with the diode output until the full regulated output voltage of 1.8V is reached and sometimes later the synchronous rectifiers are enabled at time $t_{OVR}$ causing the voltage overshoot in the output voltage and high voltage stresses on input switches. On the other hand, by enabling synchronous rectifiers at an earlier time $t_{OPT}$, when the internal Thevenin generator has just reached the desired output voltage of 1.8V at which instant the output voltage is just one diode voltage drop lower at 1.0V, the excess voltage stresses on input switches are eliminated as well as output voltage overshoot. Note that the jump in the output voltage in FIG. 14b will disappear since the Unit 1 connected in parallel has already started and reached desired output voltage of 1.8V, matching the $V_2$ output voltage Unit 2 will have at $t_{OPT}$.

Note that if the synchronous rectifiers are enabled at any time before instant $t_{OPT}$, the premature enabling of synchronous rectifiers will have the same problem as the original start with synchronous rectifiers did: the output voltage will dip to a lower value and in extreme case discussed previously be shorted to ground.

The implementation of optimum instant at this point seems rather trivial. The optimum time to enable synchronous rectifiers $t_{OPT}$ seems rather straightforward: measure the output voltage and when it is one diode drop VF below the desired output voltage of 1.8V, that is at 1.0V, enable synchronous rectifiers.

Figure 15:
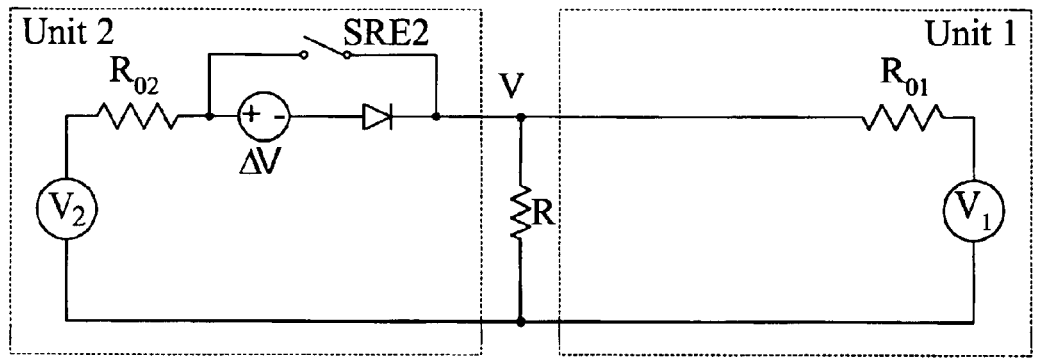
FIG. 15 illustrates the circuit model of the converters in FIG. 10b, modeling Unit 2 during its start-up with Unit 1, which already reached desired output voltage.

This solution, however, is not possible, when one takes into account that the two units are operating in parallel, and that one unit will inevitable start first, say Unit 1, and reach the desired output voltage of 1.8V first. This will result in equivalent circuit model of FIG. 15. Note that the output impedance $R_{01}$ is effectively very small, on the order of 2 milliohms so its effect ideally can be neglected. Thus, the output voltage, since the two units are connected in parallel, has already reached desired 1.8V due to the completion of the Unit 1 start-up, which now maintains that voltage at 1.8V. It is only at that point that the start-up of Unit 2 is initiated. Thus, the output voltage of Unit 2 cannot be used as a measure when to enable its synchronous rectifiers, since it is already fixed at 1.8V and does not change during Unit 2 start-up.

Figure 14B:
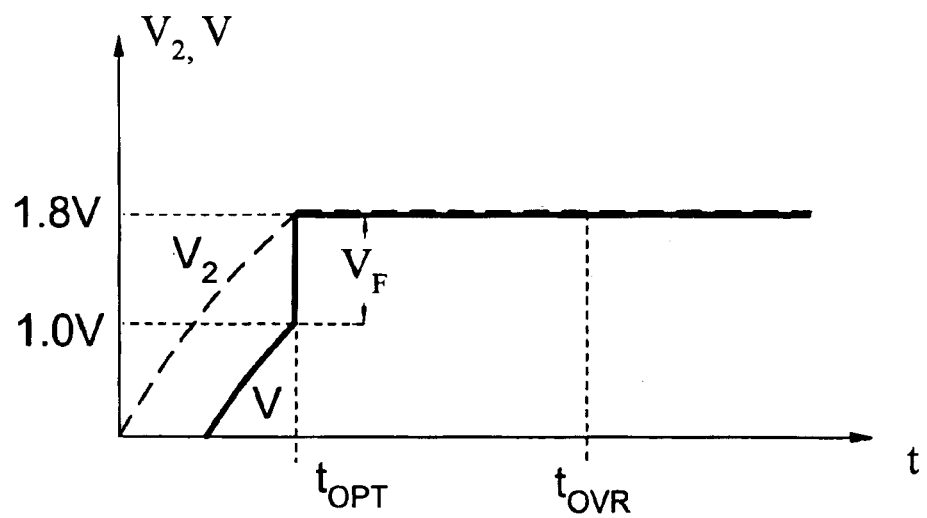
FIG. 14b illustrates how it would be desirable to enable synchronous rectifiers at an earlier time $t_{OPT}$, when the output voltage V is diode voltage drop $V_F$ lower than desired final 1.8V output voltage.

However, from FIG. 14b, there is an alternative method to determine the optimum instant $t_{OPT}$ at which the synchronous rectifier of Unit 2 should be enabled. Namely, this optimum instant $t_{OPT}$ is also instant at which internal Thevenin voltage source $V_2$ of Unit 2, which increases during start-up of Unit 2, has reached the reference output voltage of 1.8V. During start-up of Unit 2 this voltage source $V_2$ is changing and increasing gradually from zero voltage. Thus, one only needs to sense instant when that voltage $V_2$ reaches the desired output voltage of 1.8V to enable synchronous rectifiers. Once again it appears that this cannot be done. As explained before, the internal Thevenin voltage source $V_2$ cannot be measured, since it is only an equivalent voltage source, and therefore there are no accessible points to measure that voltage source during the start-up of Unit 2.

Note that Unit 2 does not start with zero output voltage as is desirable in true soft-start but, instead, it starts against a stiff output voltage of 1.8V provided by Unit 1, which initially provides fill load current. However, since Unit 2 operates with diode outputs, reverse current flow is prevented during the start-up, while internal voltage source $V_2$ increases. When ideally the Unit 2 reaches the desired 1.8V output voltage (that is when $V_2$=1.8V), the Unit 2 current will be still zero but ready to start delivering current to the load from that instant onwards. The separate standard current sharing circuit will at that instant come into play to balance the currents supplied by two units, by increasing gradually current supplied by Unit 2 from zero level and decrease the current supplied by Unit 1 since the Unit 1 was until that instant carrying the full load current. Ultimately after this transient completes, the currents will be nearly equally shared between two units and the steady-state condition is reached. This current sharing in the steady state can be realized by a number of standard prior-art methods, which are not discussed here.

The outstanding problem still remains how to detect the optimum instant $t_{OPT}$, when synchronous rectifiers of Unit 2 should be enabled.

Method and Circuits for Paralleling Converters with Synchronous Rectifiers

First Embodiment

Figure 16:
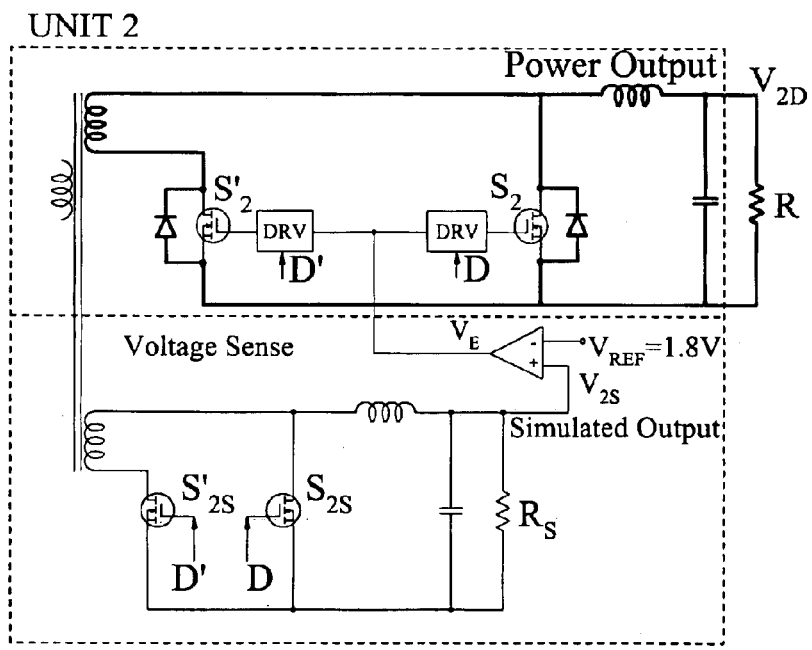
FIG. 16 illustrates generation of the voltage enable signal $V_E$ from the simulated output voltage $V_{2S}$ and desired output voltage $V_{REF}$=1.8V.

Although the internal Thevenin voltage source $V_2$ is not directly accessible for measurement during the start-up of Unit 2, the same voltage can be indirectly measured by simulating this voltage with a simulated signal output $V_{2S}$ as shown in FIG. 16. The simulated output is created by use of an additional winding on the main transformer and a pair of small signal MOSFET devices $S_{2S}$ and $S'_{2S}$ to create with an additional small inductor and capacitor the auxiliary output $V_{2S}$. Two signal MOSFET devices are operated out of phase and with the same duty ratios D and D' as power output synchronous rectifier devices. However, unlike the power output devices which are disabled initially, the two signal MOSFET devices are always enabled as soon as primary devices are enabled. It is called simulated output since it simulates the time variation of the actual power output $V_{2D}$ if the power output were operated during start-up with its synchronous rectifiers enabled. The main power output is shown in FIG. 16 in heavy lines, while the simulated output circuitry is shown in thin lines to signify that it is only used to process simulated signals at very low power level, such as miliwatts as opposed to the main power stage.

Also for easier understanding, the Unit 1 is temporarily disconnected, such that the output $V_{2D}$ of Unit 2 is once again free to change during the start-up operation. Note that simulated output exactly simulate the output voltage of the main power output, with exception that the simulated switches $S_S$ and $S'_S$ are operated always as MOSFETs current bi-directional devices (synchronous rectification always enabled, hence body-diodes never conduct and are not shown on FIG. 16), while the main power stage devices are operated with diode output, which is signified in FIG. 16 by highlighting body-diodes of respective synchronous rectifiers in heavy lines indicating their conduction (synchronous rectification disabled for those switches).

Figure 17A:
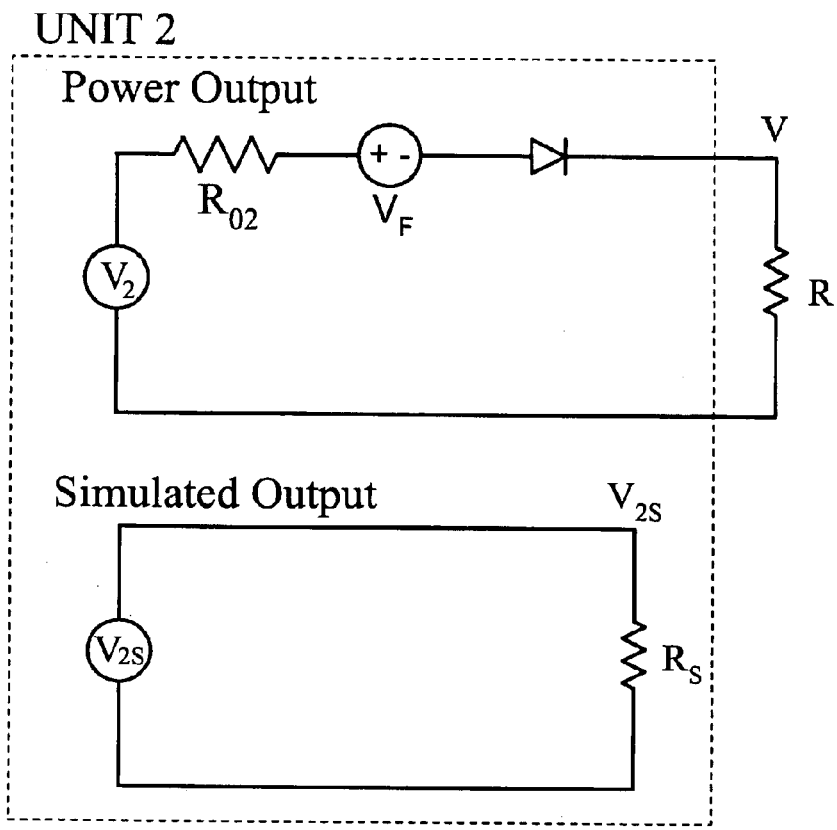
FIG. 17a illustrates the circuit model of the converter in FIG. 16 modeling both power output and simulated output.

Main power output and simulated output can now be modeled as in FIG. 17*a*. Note that the power output, which operates with diode output has appropriate diode model including diode voltage drop $V_F$, while simulated output has the model appropriate for synchronous rectifiers. In that model the output impedance is not shown since it is practically zero, resulting in the measured simulated output voltage $V_{2S}$ ideally tracking the internal Thevenin voltage source $V_{2S}$ of simulated output.

The crucial observation, which can now be made, is the following:

During start-up, the internal time varying Thevenin voltage source $V_2$ of the power output is "mirrored" by the internal Thevenin voltage source $V_{2S}$ of the simulated output:

$$V_2 = V_{2S} \tag{10}$$

This is clearly result of the fact that the auxiliary output with enabled synchronous rectifications "mirrors" internal Thevenin equivalent voltage source of the power output since it is by design forced to operate under the same duty cycle operating conditions as the power output should operate and in fact it simulates "enabled" behavior of the power output during start-up transient.

Figure 17B:
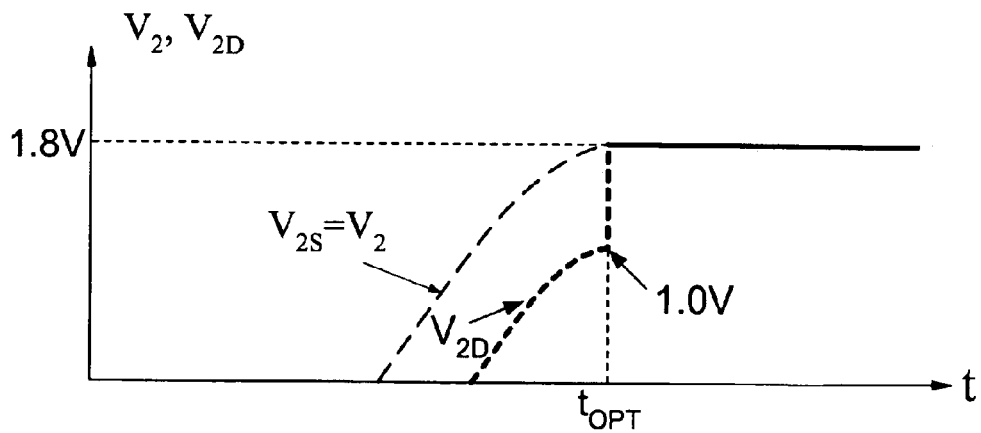
FIG. 17b illustrates an alternative to measuring simulated output voltage $V_{2S}$ to enable synchronous rectifiers at instant $t_{OPT}$ when simulated output voltage rises to the desired output voltage.

Both power output $V_{2D}$ as well as simulated output $V_{2S}$ can now be actually measured on the circuit of FIG. 16 to obtain time varying waveforms as displayed in FIG. 17*b*. Taking into account relationship (10), the measured voltage of simulated output actually predicts the rising of the internal Thevenin voltage source $V_2$ of main output during start-up, which is operated with synchronous rectifiers disabled (diode outputs). From FIG. 17*b*, the optimum time tort to enable synchronous rectifiers of power output is when $V_2$ reaches desired 1.8V output voltage. Because of (10), the circuit implementation in FIG. 16 is very simple: compare the simulated output $V_{2S}$ with desired 1.8V output voltage and when they are equal trigger enable signal $V_E$ to enable synchronous rectifiers of power stage of Unit 2.

Figure 18A:
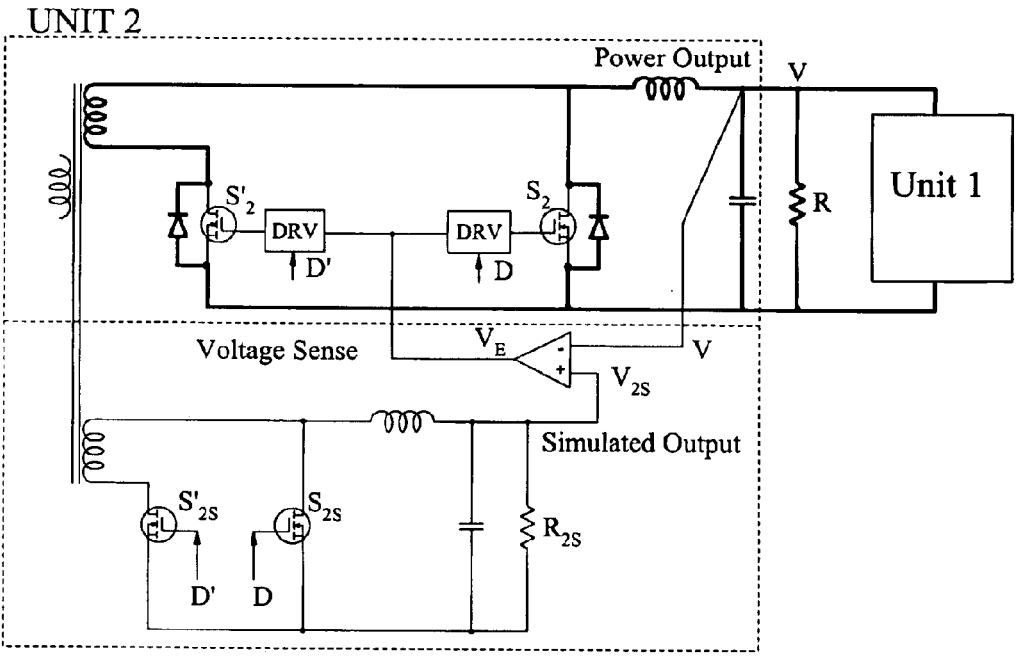
FIG. 18a illustrates the Voltage Sense method after Unit 1 connected to the output of Unit 2 has already started first and reached desired output voltage; reference voltage $V_{REF}$ in FIG. 16 is in FIG. 18b replaced by actual output voltage V common to both units.
Figure 18B:
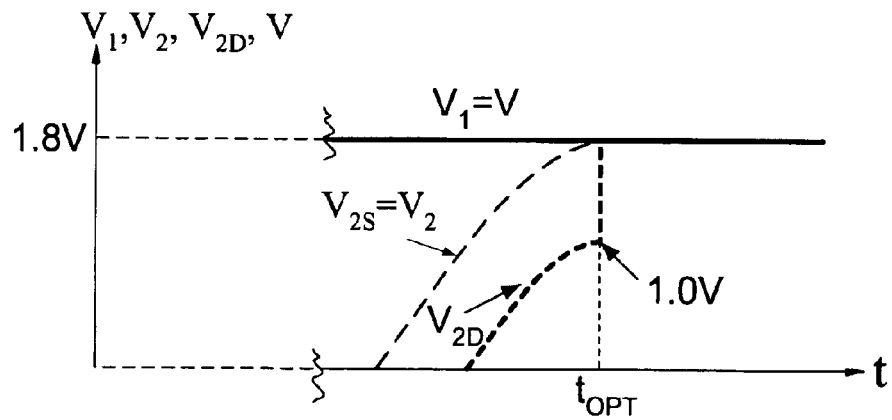

Note that the above analysis was conducted under the simplifying premise that Unit 1 was temporarily disconnected. However, since at the time $t_{OPT}$ when synchronous rectifiers of Unit 2 are enabled the common output V is the same 1.8V output voltage as generated by Unit 1, the Unit 1 could have been connected to the common output V as in FIG. 18*a* and the same previous analysis would apply equally well. Thus, the voltage waveforms are as in FIG. 18*b* indicating that the Unit 1, which started first, has already reached desired 1.8V output voltage.

Figure 19A:
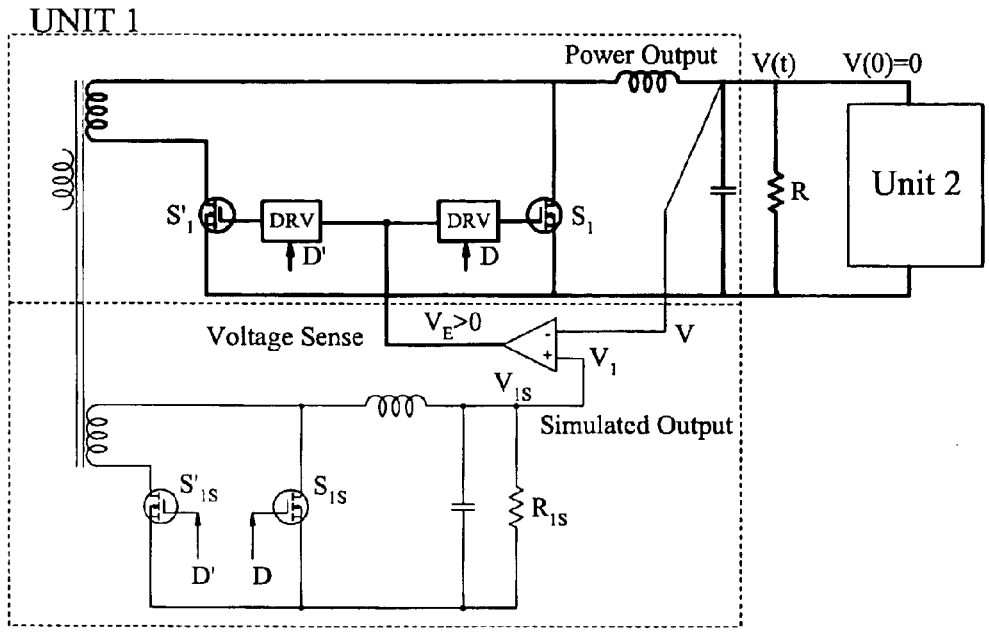
FIG. 19a illustrates that the Voltage Sense circuit in the first unit to start, Unit 1, enables synchronous rectifiers of the power output from the very start resulting in soft-start of output voltage.

It is desirable that both units operating in parallel have identical circuitry for paralleling operation. In this way, whichever unit starts first, becomes the Unit 1 in the above analysis, and the second unit to start becomes Unit 2. Therefore, there is no special external circuitry outside of each unit needed, which will favor either one or the other unit to start first and force them to operate in a conventional master-slave arrangement, in which one unit controls the current sharing between the modules and is therefore different than the others. Thus, shown in FIG. 19*a* is the detailed schematic of Unit 1 with the same additional simulated output circuitry as used for Unit 2.

The remaining question now is how will Unit 1 start-up with the same simulated output circuitry as used for Unit 2, but with Unit 2 now connected for parallel operation. It turns out that this time Unit 1 will follow different start-up then Unit 2 did. Note that the Unit 2 being the second unit to start, has the output voltage V, which is initially at zero voltage, that is, initial condition at start-up of Unit 1 is:

$$V(0)=0 \qquad (11)$$

and not 1.8V as initial start-up condition for Unit 2. Thus, both power output V and simulated output $V_{1S}$ are initially zero, hence equal. Thus comparator in FIG. 19a will produce positive enable signal $V_E>0$, which will enable both synchronous rectifiers of Unit 1 from the very start. Clearly, this soft-start will also make the enable signal throughout this start-up time ON thus keeping the synchronous rectifiers of Unit 1 enabled throughout the start-up time. Thus, the Unit 1 will be able to soft-start gradually increasing the output voltage from 0 to final 1.8V output voltage, hence the following conclusion can be made:

Whichever unit starts first, the additional simulated output circuitry will force that unit to operate with synchronous rectifiers enabled from the very beginning and throughout the soft-start process of that unit.

Note that in practice the initial output voltage V(0) may not be exactly zero at the start-up of converter, but may have some residual value, such as 0.1V or so due to some stray charging of output capacitor and other second order effects. In that case, this small voltage could be sufficiently higher from zero volts and not generate enable voltage $V_E$ to enable synchronous rectifier. To prevent that from happening in practice, the synchronous rectifiers are enabled slightly before instant tour, which corresponds to output voltage reduced by 0.1 V, or about 6% of the output 1.8V DC voltage in this case. This will insure that first to start converter will indeed operate with synchronous rectifiers enabled from the very start and avoid operation under Discontinuous Inductor Current Mode. The trade-off is that a small glitch in the output voltage is to be expected, but no other adverse effect will take place.

Figure 19B:
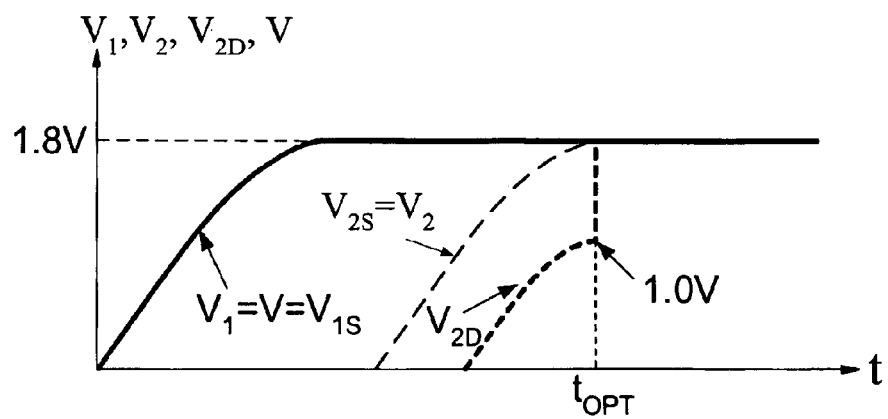

Therefore, the final voltage variations of relevant quantities of the two parallel units during start-up will be as shown in FIG. 19b. The new method implemented in one alternative with the additional simulated output circuitry of FIG. 16 has, thus, accomplished the stated objectives:

1. The voltage stress on the input switches is no worse during start-up then in the steady-state operation;
2. The overshoot in the output voltages of parallel units is eliminated;
3. Soft-start of both paralleled units is accomplished.

Several other embodiments of the present invention implement the same method but with a simplified circuitry as outlined below.

Second Embodiment

Figure 20:
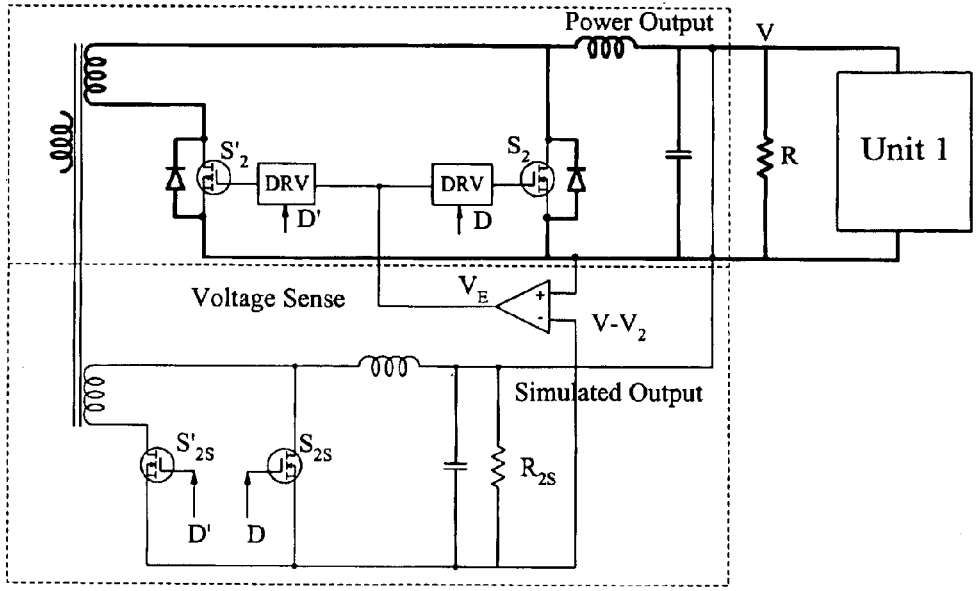
FIG. 20 illustrates the simplified Voltage Sense circuitry of FIG. 19a with one comparator terminal referenced to output ground.

The additional simulated output circuitry can be further simplified by connecting the outputs of the simulated output circuit and main power output together and therefore sense the differential voltage sense signal (V-$V_2$) with reference to the main power output return lead, as shown in FIG. 20. This circuit still has additional complexity due to presence of extra transformer secondary winding and additional output inductor winding of the simulated output. Both, however, can be eliminated in a third embodiment of the present invention.

Third Embodiment

The two transformer secondary windings can be combined into single winding with the two signal processing MOSFET switches $S_{2S}$ and $S'_{2S}$ connected directly to the secondary winding of the main transformer providing power output. The output inductor of the simulated output can also be eliminated and the desired differential voltage sense signal (V-$V_2$) sensed on the output capacitor CF of the simulated output with reference to the output voltage return (output ground). The two resistors are added in the drain lead of each auxiliary MOSFET to act as a low-pass filters to filter out the AC ripple, the role previously played by output inductor of simulated output. This third embodiment is one of the best modes to practice this invention since it implements the method of the present invention with a very simple signal processing circuit and without complicated additional magnetics windings and magnetics components, such as output inductor of simulated output.

Figure 21:
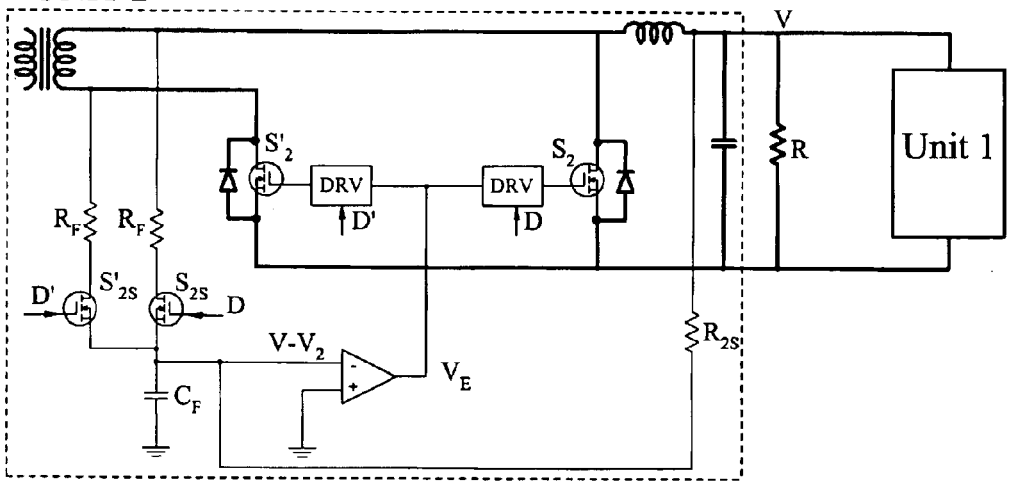
FIG. 21 illustrates the Voltage Sense circuitry further simplified by eliminating transformer secondary winding and output inductor in the simulated output and yet retaining the same Differential Voltage Sense Signal (V-V$_2$) as in FIG. 20.

This simple signal processing circuit shown in thin lines in FIG. 21 senses a voltage which is equivalent to Thevenin voltage source $V_2$ of Unit 2, compares it with the actual output voltage V and generates enable signal $V_E$ to enable synchronous rectifiers of Unit 2 when the two are equal. Thus, this simple circuit in FIG. 21 (and previous more complex alternatives) is designated as Voltage Sense circuit for enabling synchronous rectifiers, or from now on for simplicity of expression, termed Voltage Sense Circuit, which illustrates one practical way of implementing the underlying Voltage Sense Method to Enable Synchronous Rectifiers also called for brevity, Voltage Sense method.

Note the extreme simplicity of the Voltage Sense method. It consists of the following signal processing components, which are all very small and inexpensive: two MOSFET devices, one comparator, two resistors and one capacitor. The two inputs (resistors) of the Voltage Sense circuit are connected directly to the power transformer secondary leads. The output of the Voltage Sense circuit is enable signal $V_E$.

When this signal is low, synchronous rectifiers are disabled and when it becomes high, synchronous rectifiers are enabled. Note that even further simplification and cost reduction could be achieved if the Voltage Sense circuitry is built into the Pulse Width Modulated (PWM) Integrated Circuit (IC) controlling the whole converter, such as its soft-start, driver stages, overvoltage and overcurrent protection, feedback control etc.

Although only a limited number of particular embodiments, which implement the new Voltage Sense method of this invention with simple circuits have been illustrated and described, it is recognized that modifications and variations may readily occur to those skilled in the art.

Fourth Embodiment

Figure 22:
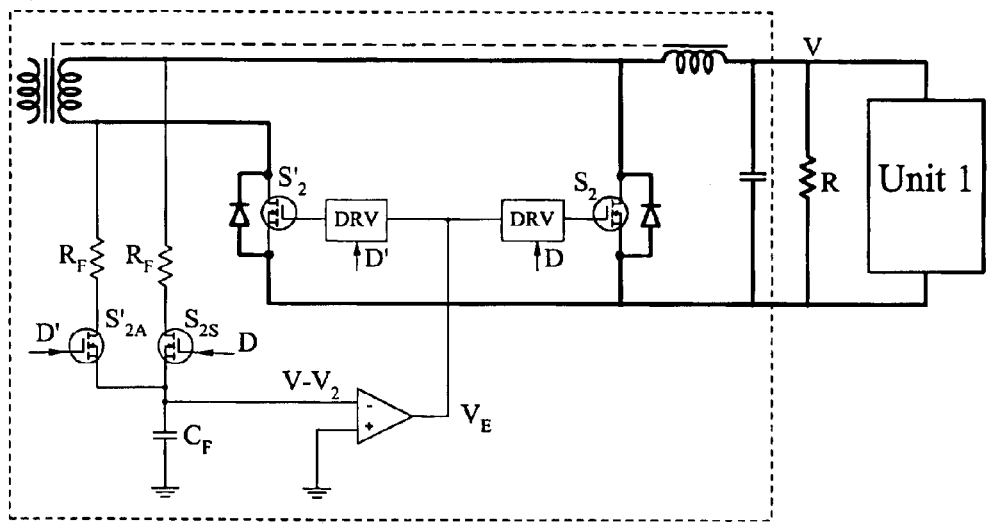
FIG. 22 illustrates that the Voltage Sense method is equally applicable and effective when transformer inductor of Power Output are combined into a single Integrated Magnetics structure.

Some switching converters which have separate inductors and transformer have also useful practical extensions in which isolation transformer and one or more inductors can be beneficially coupled into a single Integrated Magnetics structure with additional benefits, such as near zero ripple output or input current or both, reduced size of magnetics and other performance improvements. The Voltage Sense method and Voltage Sense Circuit implementations introduced will also work as intended in the presence of Coupled-Inductor and/or Integrated Magnetics extensions, such as the one shown in FIG. 22 in which output inductor is combined with isolation transformer into and Integrated magnetics circuit. It should be emphasized that the prior-art methods, such as Fixed Timing and Current Sense methods are not suitable for paralleling converters with synchronous rectifiers and Integrated Magnetics.

Fifth Embodiment

Figure 23A:
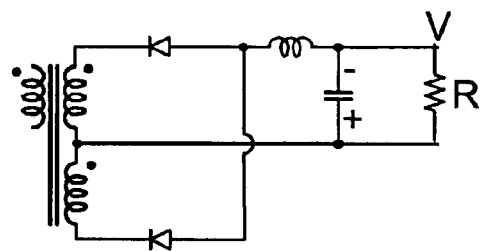
FIG. 23a illustrates example of the center-tap rectification topology on the converter output with two diode rectifiers.

The topology of the forward converter is such that the secondary side rectification is derived from simple secondary winding as seen in FIG. 10a. However, the Voltage Sense method described for paralleling as well as the various Voltage Sense Circuit implementations of the disclosed method presented so far and including the best mode of implementation of FIG. 21 are not limited to that particular topology of the secondary side rectification but is equally applicable to other secondary side rectification schemes. Shown in FIG. 23a is the widely used rectification scheme, which is used in many converter topologies as a secondary side rectification scheme, such as full-bridge, half-bridge and push-pull converter types and many others. As seen in FIG. 23a there are two secondary windings, whose common connection is at the same time used as the output ground. Note also that the diode connection is such that a negative output voltage with respect to ground is generated.

In comparison with forward converter rectification (single sided, single secondary winding), this rectification with two secondary windings seems a lot different. However, that is not the case, since this configuration can be modified to an equivalent configuration, which lends itself to the same implementation of the Voltage Sense Circuit of the present invention as in previously demonstrated forward converter as explained below.

Figure 23B:
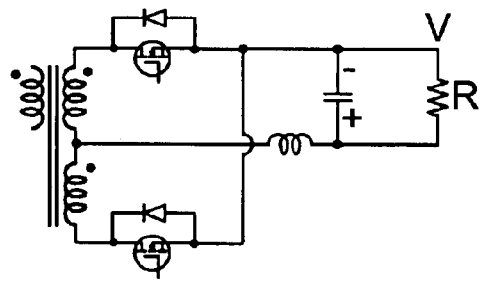
FIG. 23b illustrates another example obtained by replacing diodes in FIG. 23a with synchronous rectifiers.
Figure 24:
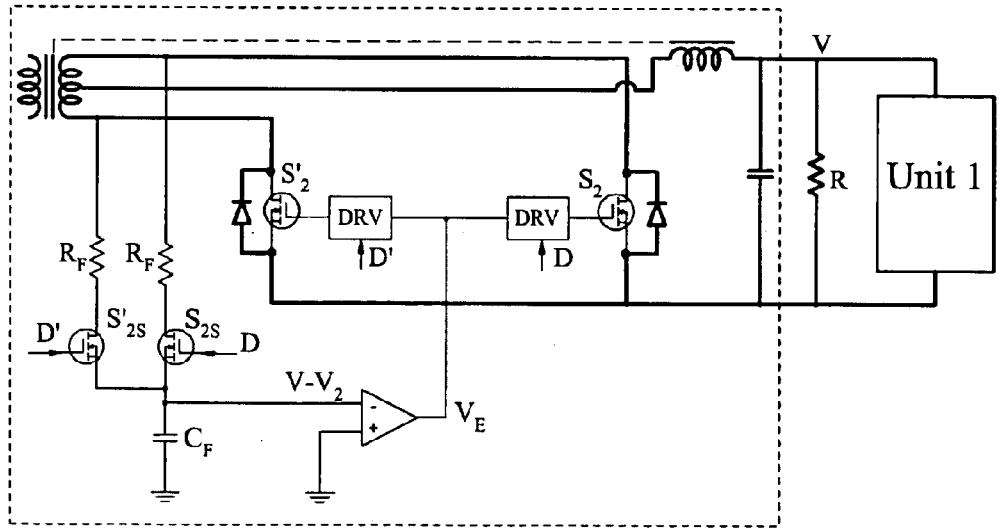
FIG. 24 illustrates how the same Voltage Sense circuit of FIG. 21 is used in the case of the center-tapped secondary side rectifier configuration.

First, the secondary side diode rectifiers of FIG. 23a are replaced with the synchronous rectifiers as in FIG. 23b. Then, the output inductor is moved from the top lead to the bottom lead, such that it is connected to the positive terminals, with the negative terminal being considered secondary side ground. This connection is often called center-tapped secondary side rectification because output is tapped from the center of the two winding secondary. Such connection of the synchronous rectifiers is actually preferred from the practical standpoint, since the n-channel MOSFETs will be in the topology of FIG. 23b connected with the source leads of the MOSFET grounded (connected to negative output terminal). Clearly this results in the simple direct gate drive scheme for MOSFET as opposed to more complex and less ideal floating drive scheme. With this straight-forward modification of the secondary side topology, the same Voltage Sense Circuit used in forward converter can be directly implemented as shown in FIG. 24. The only difference is that the additional Voltage Sense Circuit of the present invention is not connected to one winding as in FIG. 21 of the forward converter rectification, but, instead across the outer leads of the center-tapped secondary windings as illustrated in FIG. 24. In fact, Voltage Sense Circuit is connected in both cases directly to the drain leads of their corresponding power processing MOSFETs (shown in thick lines) as seen in FIG. 21 and FIG. 24. Thus, the same benefits and same start-up performance of parallel converters with synchronous rectifiers is obtained in both cases.

Sixth Embodiment

Figure 25A:
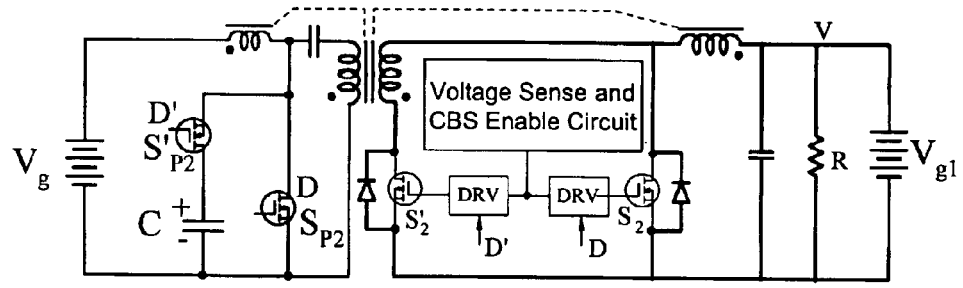
FIG. 25a illustrates the Voltage Sense method on a switching converter with all output rectifier switches being Current Bi-directional Switches (CBS)
Figure 25B:
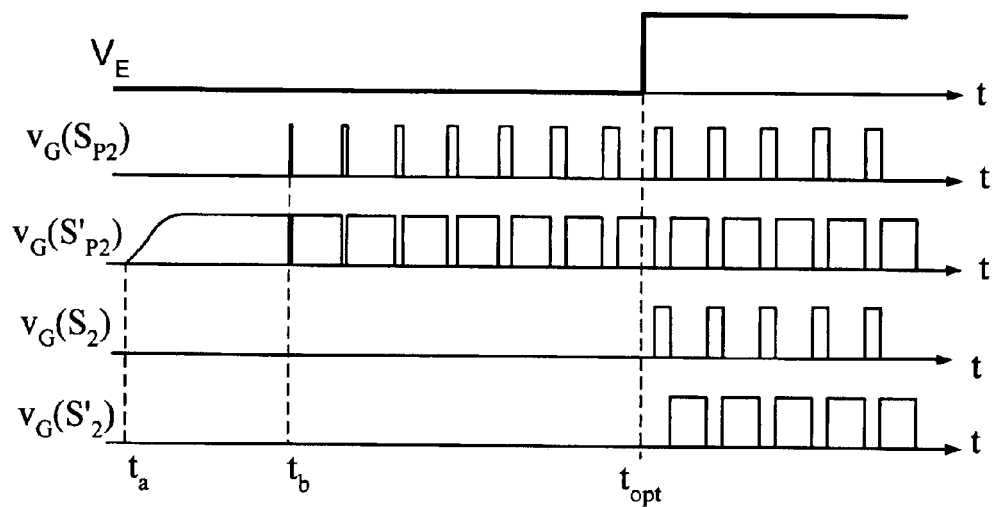
FIG. 25b illustrates characteristic waveforms during the start-up of two paralleled units using Voltage Sense circuit and displaying digital enable signal V$_E$.
Figure 25C:
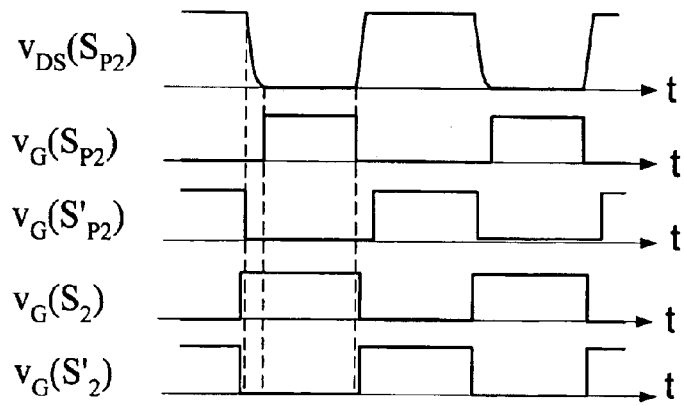
FIG. 25c illustrates the timing diagram of all four CBS switches of the converter in FIG. 25a showing that the output switch S$_2$ is turned ON even before its body-diode starts to conduct.

Voltage Sense and its circuit implementation are very general and can be implemented in paralleling converters with not only synchronous rectifiers in the output, but also more general with converters whose outputs are Current Bi-directional Switches (CBS) such as the converter of FIG. 25a. As explained in definitions in the Introduction section, the term synchronous rectification is used in industry to designate the special application of Current Bi-directional switches, such as MOSFET switching transistors, in which the timing control of these devices is such that they are turned ON during the same time when their body-diodes conduct, so as to by-pass the body-diode conduction through the low ON resistance of the MOSFETs and eliminate voltage drop and efficiency loss due to conduction voltage drop on the body-diodes. Often synchronous rectifiers are driven from the extra drive winding on the isolation transformer of the converter in a self-driven configuration. However, new switching converters are being disclosed, such as the converter of FIG. 25a in which MOSFET transistors on secondary side such as $S_2$ and $S'_2$ obey more general function of independently controlled Current Bi-directional Switches (CBS). In this configuration this switch $S_2$ is even conducting when its internal body diode would not be conducting. This results in not only reduction of the conduction losses as in synchronous rectifier applications, but also in further improved efficiency owing to reduction of switching losses and the lossless switching operation realized by special timing control of that switch. Thus, this switch is operating as an independently controlled general CBS switch and not as a synchronous rectifier, which is a special limited application of the more general CBS switch. For example, the close-up of the gate drive voltages of the four switches in FIG. 25c reveals that the output switch $S_2$ is turned ON even before the corresponding primary side switch $S_{P2}$ is turned ON. This is in contrast to the case in forward converter of FIG. 30a in which the switch $S_2$ cannot be turned ON before switch $S_{P2}$ is turned ON. If in FIG. 30a body-diodes of output switches are considered, they cannot conduct before respective primary side switch (with same duty ratio drive D) turns ON. Clearly, switch $S_2$ in FIG. 25c operates as independently controlled switch which conducts during the time interval its internal body-diode would not conduct.

Nevertheless, the output CBS switches are still current bi-directional and lead in parallel operation of converters to the same problem of shorting the output during the start-up. FIG. 25a includes the same Voltage Sense circuit which together with the soft-start of the primary side switch $S_{P2}$ as shown with the waveforms in FIG. 25b will also lead to enabling of CBS switches at the instant $t_{OPT}$ and provide the same benefits as demonstrated for converters with output synchronous rectifiers. Note also that the same benefits are available when the transformer and two inductors are magnetically coupled and combined into a single magnetics circuit in this converter with CBS switches as shown in FIG. 25a as well as when they are used separately.

Seventh Embodiment

Figure 26A:
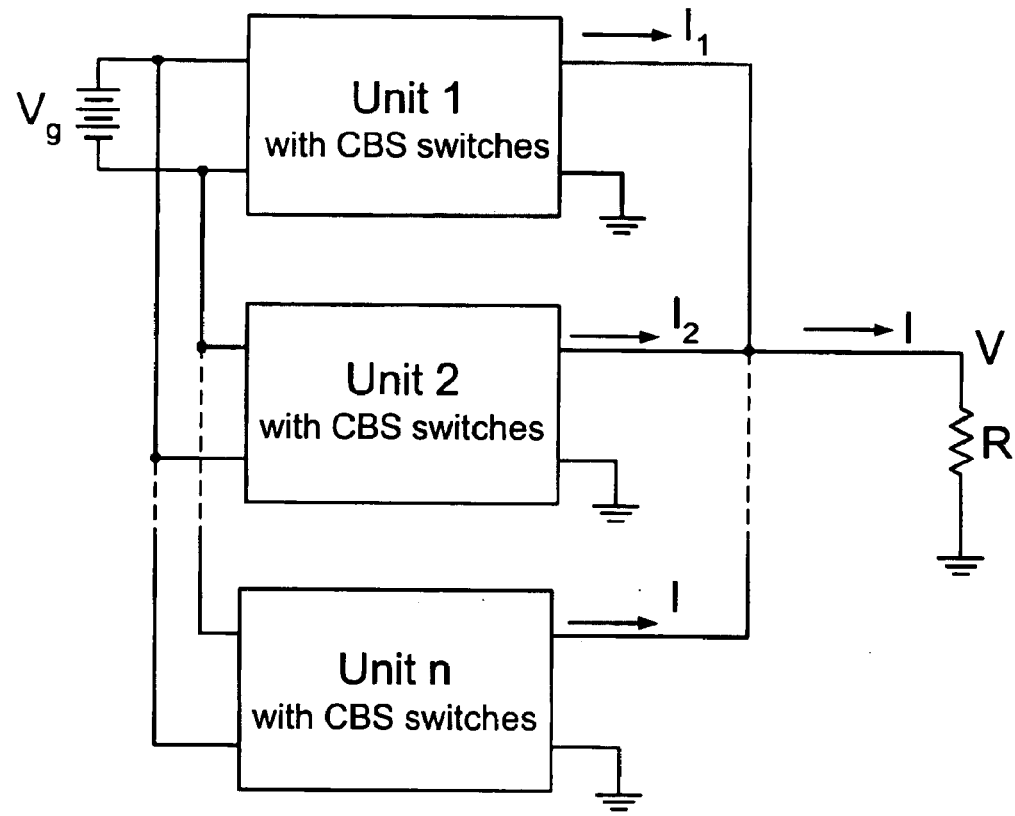
FIG. 26a illustrates that a Voltage Sense Method is applicable to a plurality of the switching converter units connected in parallel with each unit having in its output all Current Bi-directional Switches and the Voltage Sense circuit of FIG. 26b.

The presented method and circuit implementation are also general and are not limited to just two switching converters connected in parallel as demonstrated so far. Shown in FIG. 26a is the block diagram of the plurality of switching converters operated in parallel. In general each of those converters, depending on their converter topology has one or more output current bi-directional switches. In either case, however, the possible shorting of the output voltage in parallel operation during start-up is prevented with the same Voltage sense circuit of FIG. 26b which is a part of each of parallel units in FIG. 26a.

Figure 26B:
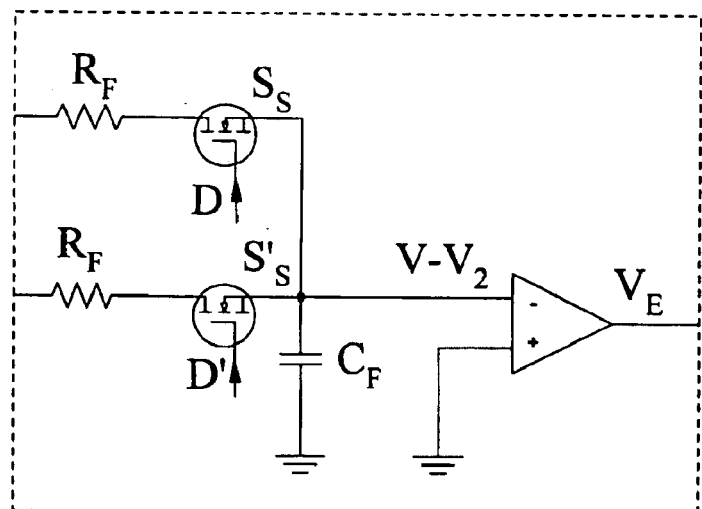

As long as each converter of FIG. 26a has the Voltage Sense circuit of FIG. 26b of the present invention for enabling CBS rectifiers at an optimum time for each unit, a well behaved operation of plurality of paralleled converters during the start-up is obtained: the output voltage has no voltage overshoots and all units have input switches whose voltage stress during the start-up does not exceed its final value when all units are up and running in parallel in steady-state.

The disclosed Voltage Sense method and a number of alternative Voltage Sense circuit implementations for paralleling converters have been illustrated on example of a prior-art forward converter with the voltage clamp. However, the Voltage Sense method and Voltage Sense circuit implementations disclosed are general and can be implemented to a large number of prior-art switching converters as well as newly invented converter topologies which have one or more CBS switches in their outputs.

Modeling of the Switching Converters at Light Load

Up to now the effect of the operation in the discontinuous conduction mode has not been analyzed. Let us now assume that the load current is small so that the diode output stage operates in Discontinuous Inductor Current Mode (DICM). The output voltage for the converter in DICM mode with diode output is:

$$V_{DIC}=V_2-\Delta V+\Delta V_{DIC} \qquad (12)$$

where $\Delta V_{DIC}$ is the additional output voltage caused by the discontinuous inductor current mode operation, and $\Delta V$ is output voltage drop due to the forward voltage drop of the diode. The exact value of $\Delta V_{DIC}$ varies with the component values and load conditions. Note however, the opposite sign in the change of output voltage due to discontinuous inductor current mode. The output voltage $V_2$ is as before, the ideal output voltage obtained in the presence of ideal synchronous rectifiers for which the voltage drop is negligible and in continuous conduction mode.

The exact value of $\Delta V_{DIC}$ varies widely with the component values, load conditions, and topologies. However, in general, the lighter the load the higher the value of $\Delta V_{DIC}$. When the load current reaches the critical value $I_C$ at which converter is on the border between discontinuous inductor current mode (DICM) and continuous inductor current mode (CICM), $\Delta V_{DIC}$ drops to zero.

For example, a buck converter operating from 12V input at 50% duty ratio will have a calculated output voltage of 5.65V if operating in continuous conduction mode (0.7V diode voltage drop is considered). When the load current is reduced to zero, the output voltage will increase to the value of input voltage of 12V. A flyback converter, operating from 6.35V input and the same 50% duty ratio will have the same calculated 5.65V output voltage in CICM mode, but the output will shoot up to infinity at no load.

Comparison of Paralleling Methods for Synchronous Rectification Converters

The three methods for paralleling of switching converters with synchronous rectification are now briefly reviewed and compared. The first two methods are prior-art methods, Fixed Timing and Current Sense method, while the third Voltage Sense method is the subject of present invention. In all these methods one of the units, for example the Unit 1 has started first. The three methods then clearly differ in the way the second Unit 2 and subsequent units in case of more than two converters are started.

Fixed Timing Method

Figure 27:
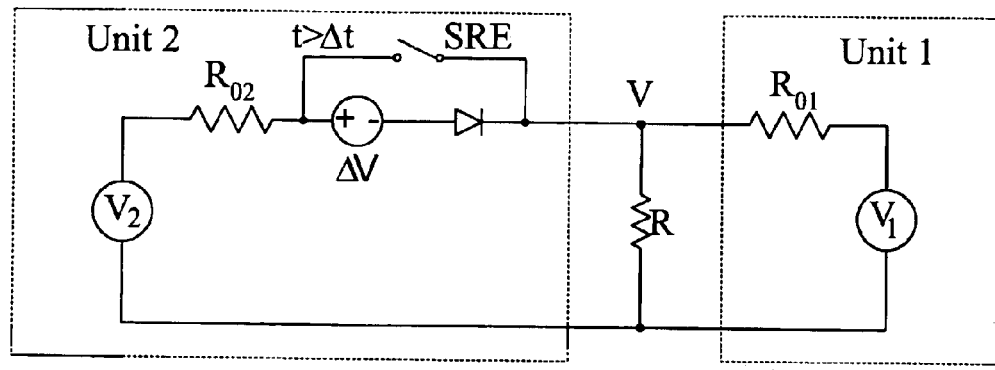
FIG. 27 illustrates the Circuit model for the Fixed Timing method of start-up of parallel converters with synchronous rectifiers.

The Fixed Timing method was discussed earlier on the example of the prior-art paralleling of Ćuk converters. In this control method, the synchronous rectifier in Unit 2 is initially disabled at startup (switch SRE 2 is disabled as shown in FIG. 27). After the fixed time $\Delta t$ from the start of Unit 2, synchronous rectifiers are enabled and Unit 2 also provides the current to the load.

If the load current is very low, the converter of Unit 2 will operate in DICM mode during its start-up and before its output synchronous rectifier is enabled. Thus, the voltage drop $\Delta V_{DIC}$ will have a rather large value, and the internal voltage $V_2$ will be lower than the load voltage V. Therefore, there will be a voltage glitch on V as the synchronous rectifier is suddenly enabled. At higher load currents, the internal voltage $V_2$ of Unit 2 will be only a diode voltage drop higher than the load voltage V, and there will be a voltage spike on V as the synchronous rectifier is suddenly enabled. As discussed before, by implementation of the soft-start control to the output synchronous rectifier the glitch or spike on the output voltage could be eliminated.

Since voltage $V_2$ of Unit 2 can be up to one diode voltage drop higher than the voltage $V_1$ of Unit 1 (that is condition just before the synchronous rectifiers of Unit 2 are enabled) voltage stress on the input switching devices in converters with very low output voltages will still be a problem as discussed in previous sections.

As discussed earlier, the Fixed Timing is also not suitable for the converters with two or more synchronous rectifiers and is limited to converters with single synchronous rectifier. This is because the "soft-start" of synchronous rectifiers cannot be implemented due to inherent problems with excessive switching spikes in case more than one synchronous rectifier is soft-started.

Current Sense Method

Figure 28:
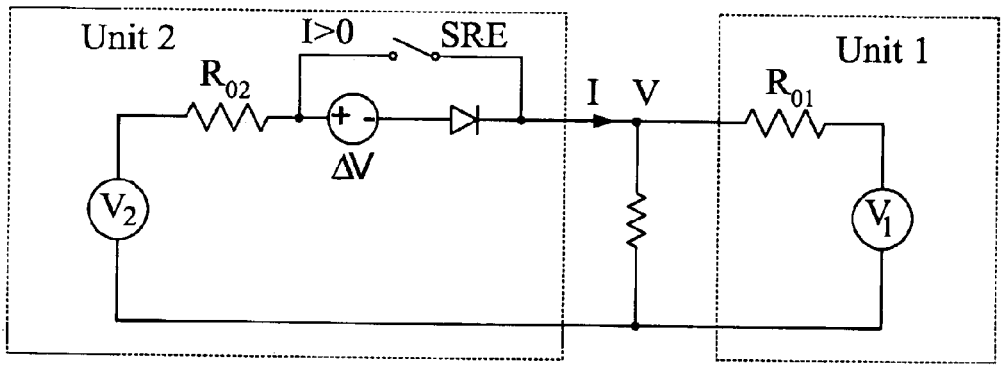
FIG. 28 Circuit model for the Current Sense method of start-up of parallel converters with synchronous rectifiers.

In the Current Sense method, the DC current delivered by Unit 2 to the load is measured as shown in FIG. 28. At startup, the synchronous rectifier in Unit 2 is initially disabled. Only after a positive output current is established the synchronous rectifier will be enabled. The current can be measured either at the output or on the output device. The DC current I can be directly measured on the output by a current sensing resistor for example, but the resulting losses will be fairly high at high output currents. Indirectly, this current could be measured by sensing the synchronous rectifier current with a current sense transformer and then rectifying that signal to obtain the value of the DC load current. However, at high switching currents, the additional size, leakage inductance and associated losses from the current sense transformer makes this option unattractive as well. Using a Hall effect current sense device eliminates most of the losses, but the bulk and cost is prohibitive. In any case, measuring a very high current at low loss is not an easy task.

After the diode starts conducting, the output synchronous rectifiers are enabled. Just before that takes place, the output voltage $V_2$ of Unit 2 is one diode voltage drop higher than the voltage V1 of Unit 1, hence the high voltage stress is present on the input switching devices in converters with very low output voltage such as 1.8V. The output voltage will also have a spike of one diode voltage drop when the switch S is closed, unless the synchronous rectifier is soft started. This method is also not suitable for switching converters with two or more synchronous rectifiers. This Current Sense method, but without synchronous rectifier soft starting is the subject of a few patents issued in recent years as listed in Introduction section.

Voltage Sense Method

In the new Voltage Sense method shown in FIG. 29, both the output voltage $V_2$ of Unit 2 and load voltage V are monitored. When the voltage $V_2$ reaches the value of the load voltage V, the output CBS rectifiers are enabled. Since the two voltages are equal in value at the time when the CBS rectifiers are enabled, there is no need to "soft-start" the CBS rectifiers. This is just what is needed since the converters with two or more CBS rectifiers in the output do not permit soft-starting of CBS rectifiers.

Also, the ideal output voltage $V_2$ of Unit 2 never exceeds V, thus there is no high voltage stress problem. At very light loads, Unit 2 may stay in discontinuous conduction mode after startup, and the CBS rectifier will not be enabled immediately. This is because $\Delta V_{DCM}$ is quite large when the converter has a very light load, therefore $V_2$ stays lower than V. However, as soon as the load current increases, the output current of Unit 2 will increase as well. As a result, $\Delta V_{DIC}$ will decrease, and $V_2$ will increase. The CBS rectifiers of Unit 2 will be enabled as soon as $V_2$ equals to V. This mode of operation only occurs when the load is very light. Therefore the loss in the output diode is not significant. In any case, the synchronous rectifiers of Unit 2 will be enabled and stay enabled the first time the load increases enough to bring the Unit 2 into continuous conduction mode so that $V_2$ and V are equal. The unit which starts first, starts with zero output voltage. Therefore the CBS rectifiers of the first to start unit say Unit 1, will be enabled from the very beginning of the start-up.

Note that in the real circuit the voltage $V_2$ cannot be directly monitored, since the common load voltage V, which could be measured, is already in the steady state and dictated by the output voltage of Unit 1. Thus, this Voltage Sense method utilizes additional simulated output circuit to simulate voltage $V_2$ and define the optimum condition at which CBS rectifiers should be enabled.

The advantages of the three methods are highlighted in the following Table III.

TABLE III

|  | Timing Control | Current Control | Voltage Control |
|---|---|---|---|
| Is current backflow during start-up prevented? | Yes | Yes | YES |
| Is surge or glitch during start-up eliminated? | No[1] | No[1] | YES |
| Is excess voltage stress of input switches eliminated? | No | No | YES |
| Is method suitable for converters with two synchronous rectifiers? | No[2] | No[2] | YES |

Note[1]: Soft-start of the synchronous rectifier could eliminate the surge or glitch.
Note[2]: Soft-start of the synchronous rectifier cannot be implemented. Voltage stress problems at low output voltages.

This Voltage Sense method is verified on an experimental set-up consisting of two 100 W switching converters with synchronous rectifiers operated in parallel. The results of the experimental verification are included in the next section.

Experimental Results

Figure 30A:
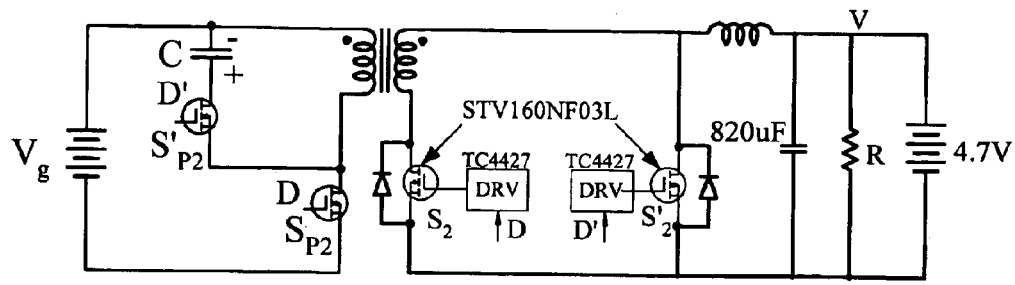
FIG. 30a illustrates the circuit with key component designation used for experimental verification of the Fixed Timing method.

The experimental converter with two secondary side synchronous rectifiers was built as in FIG. 30a, which shows the simplified schematic of the experimental converter including the designation of key components used. The converter was designed to operate from 48V nominal input voltage and to deliver 5V, 20 A full load output. Note also that the battery of 4.7V is connected on its output to simulate the presence of the Unit 1, which has already started and reached steady state voltage of 4.7V.

Objective of Experiment #1 described below was to demonstrate the operation when the paralleling is attempted with the straightforward control with synchronous rectifiers enabled from the beginning of the start-up process. This would result in temporary shorting of the output voltage to ground, which in many practical applications is not acceptable. The gate drive signals for all four controllable switches during start-up are shown in FIG. 30b and their magnified version in FIG. 30c.

Figure 31A:
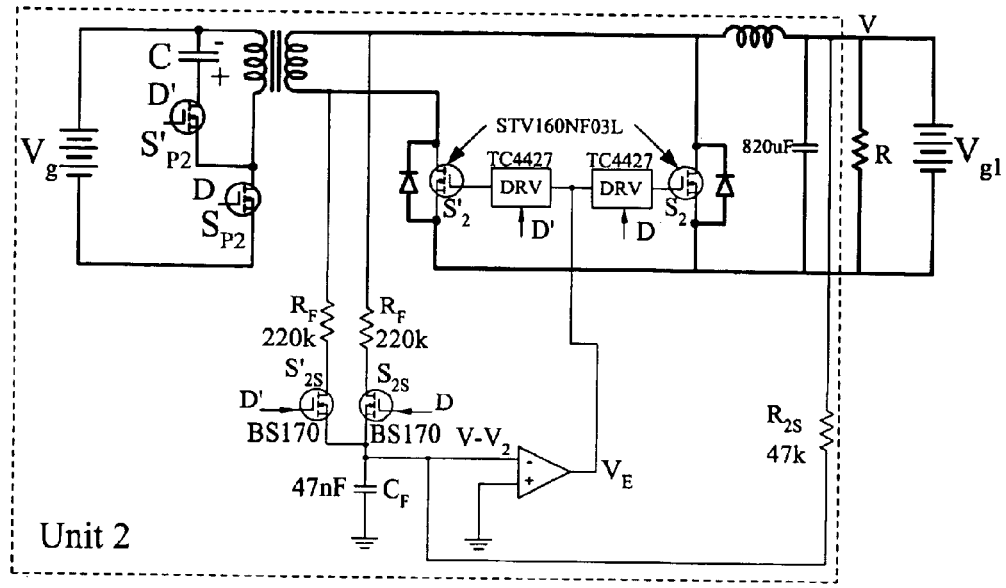
FIG. 31a illustrates the experimental converter with the designation of the key components used for both power stage and Voltage Sense circuit.
Figure 31B:
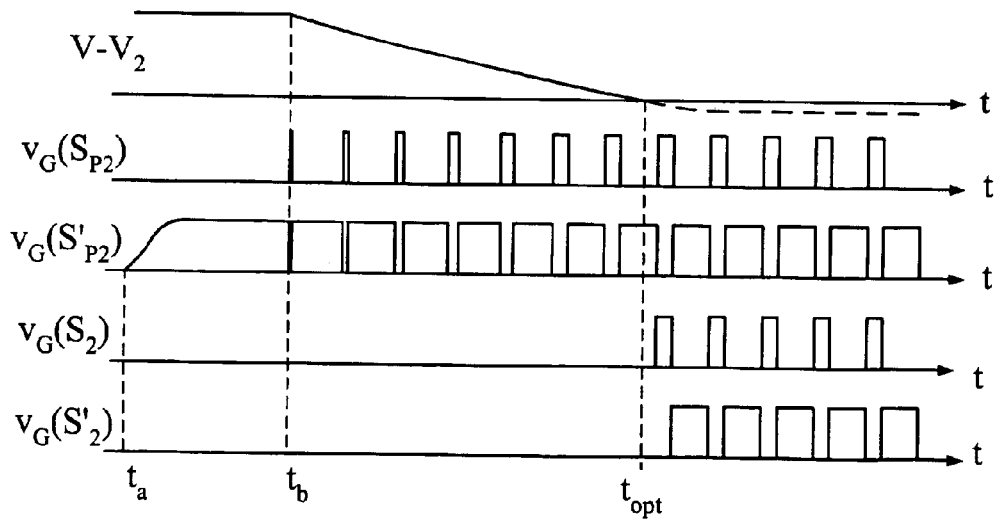

For the Experiments #2 and #3 additional signal processing circuitry shown in FIG. 31a is added to implement Voltage Sense method. The gate drives of the four switches are also appropriately modified for the Voltage Sense method (FIG. 31b). The housekeeping supply is started at instant $t_a$ but secondary side synchronous rectifier switches are still disabled. Then the converter is soft-started at instant $t_b$ but synchronous rectifier switches of the power stage are still disabled until time $t_{OPT}$. This effectively operates the Unit 2 converter with diode rectification on the output until instant $t_{OPT}$. At that instant, the continuously monitored differential voltage sense signal (V-$V_2$) drops to zero triggering enable signal $V_E$ which enables switching of the secondary side MOSFET synchronous rectifiers at instant $t_{OPT}$.

Experiment #1—Synchronous Rectifiers Shorting Output at Start-up

Figure 30B:
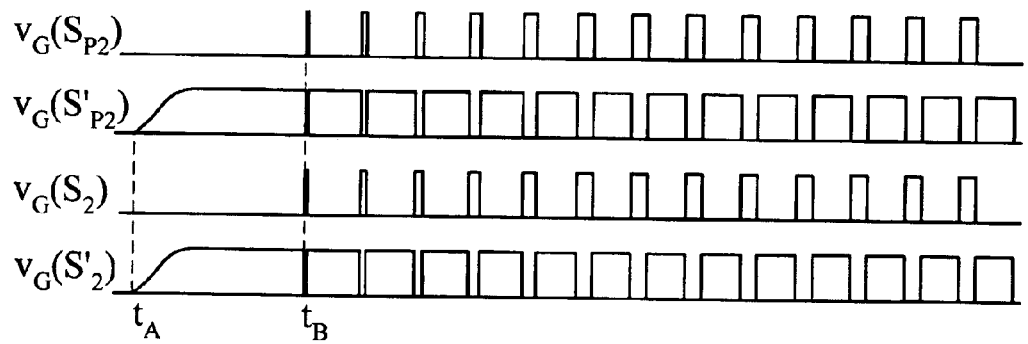
FIG. 30b illustrates the gate drive voltages of all four synchronous rectifier switches.
Figure 30C:
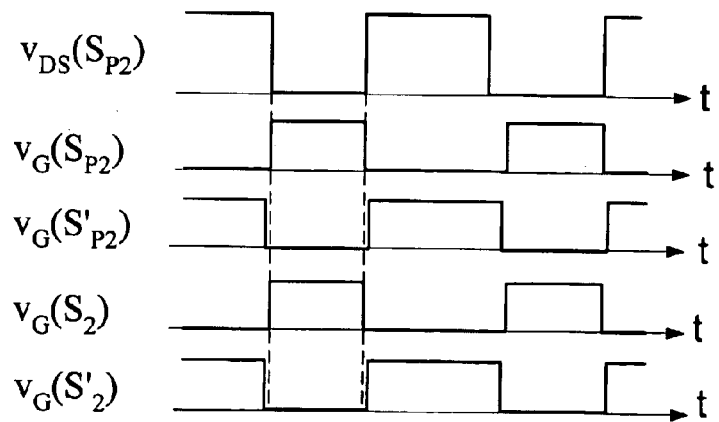
FIG. 30c illustrates that the ideal synchronous rectifiers are conducting during the same intervals as their respective body-diodes (by-passing body-diode conduction losses) and only have a short dead-time between input synchronous rectifiers and a short dead-time between output synchronous rectifiers to prevent their cross-conductions and the respective circulating currents.
Figure 32:
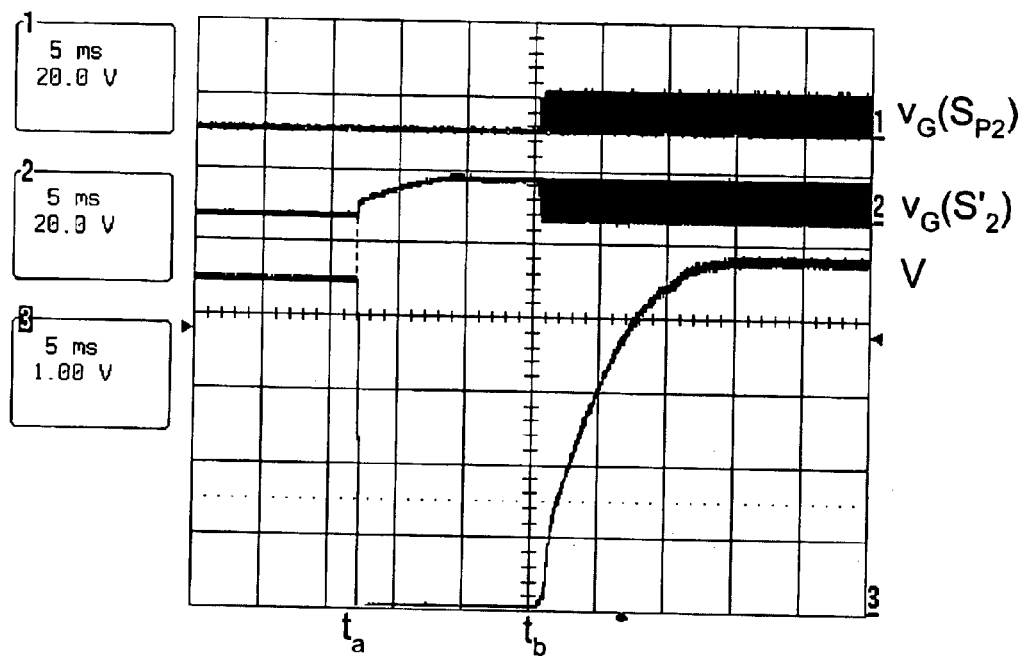
FIG. 32 illustrates that output voltage in the converter of FIG. 30a drops to zero voltage (shorted output) in the absence of the Voltage Sense circuit at the beginning of the start-up with synchronous rectifiers enabled.

For this experiment, the experimental circuit in FIG. 30a and the drive voltage waveforms of FIG. 30b are implemented. The waveforms in FIG. 32 display the following: top trace is the gate voltage of the primary side duty ratio controlled switch $S_{P2}$, middle trace is the gate voltage of the synchronous rectifier switch $S'_2$ and the bottom trace the output voltage waveform V during the start-up. The housekeeping supply has started at instant ta and almost instantly the output voltage was shorted to ground, since one of the secondary synchronous rectifiers was turned ON and shorted the 4.7V battery on the output. When the converter is soft-started at instant $t_b$ by applying duty ratio controlled gate drive of primary switches, the output voltage V increases gradually to final value of 5V.

The parallel operation of the converters with the synchronous rectifiers enabled from the very beginning of the start-up is dangerous and prone to failure since, in addition to abrupt drop of output voltage to zero voltage, it is also accompanied by the large reverse circulating current flow, which leads to catastrophic failure during the start-up. Shorting the output, even temporarily, will lead to the short circuit current, which is limited by only very low resistances in the short circuit pass. Even if each converter connected in parallel has current limiting protection, this will not protect the shorted switch from blowing up. For example, if four units are operating at full load and this last unit starts with shorted output. Thus, the output switch must take the combined current of four units making it conduct current four times higher than it is designed for and inevitably leading to failure.

Experiment # 2—Start-up of Unit 1 with Voltage Sense Method

This experiment is conducted with the Voltage Sense circuitry added as in FIG. 31a but with the battery of 4.7V disconnected from the output and the converter operates into resistive load only, so that the output voltage starts from zero voltage. The gate drive voltages are as in FIG. 31b. This experiment is made to verify that the new Voltage Sense circuitry works in such a way to automatically enable synchronous rectifiers for Unit 1 even before the built in soft-start circuitry starts to raise gradually the output voltage from zero volts to full 5V output. The waveforms in FIG. 33 display the following: top trace is the drain to source voltage of the primary side duty ratio controlled switch $S_{P2}$, middle trace is the gate voltage of the synchronous rectifier switch $S'_2$ and the bottom trace the output voltage waveform V during the start-up.

Additional Voltage Sense senses the voltage (V-$V_2$), which is now zero, since both V and $V_2$ are initially zero. As the result, enable signal is high and synchronous rectifiers are enabled before the converter is even started. However, this time there is no harm in having synchronous rectifiers enabled, since the output voltage is at that instant zero and kept at zero voltage. However, the moment the converter is started at instant $t_b$ by soft-start of primary side switching devices, the converter starts smoothly from zero volts and gradually raises until final value of 5V as seen by the bottom trace in FIG. 33 displaying the output voltage.

Figure 33:
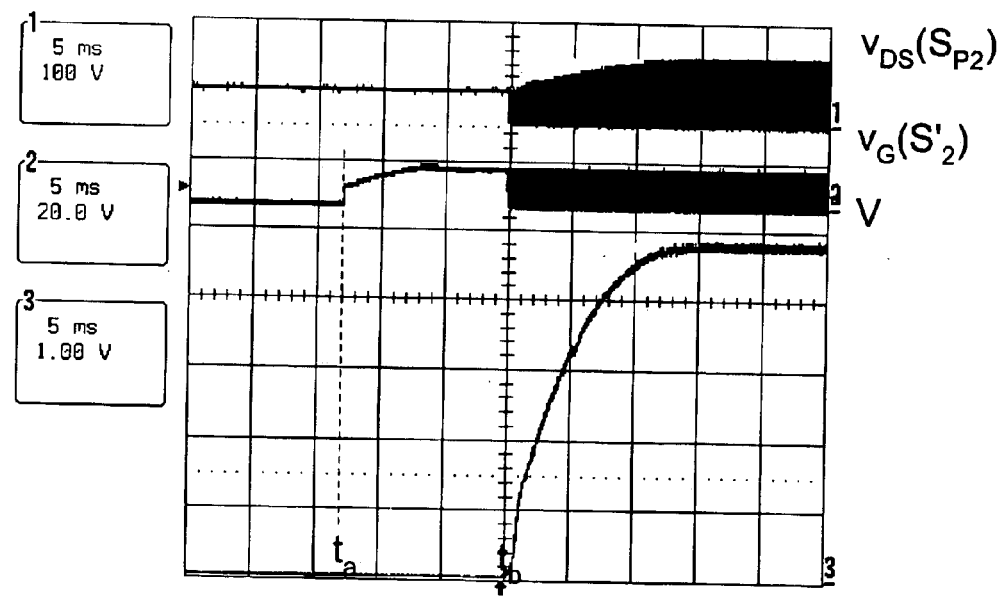
FIG. 33 illustrates the output voltage soft-start of Unit 1 with Voltage Sense control, which enables from the start all synchronous rectifiers of first to start Unit 1.

Thus, the waveforms in FIG. 33 confirm that the new Voltage Sense circuitry operates in such a way that for Unit 1 (which starts from zero output voltage) it enables automatically synchronous rectifiers at time ta on the secondary side even before the converter is soft-started at time $t_b$. Note that the voltage stress ($V_{DS}$) of the primary switches (top trace) is slowly rising until final value with no overshoot and without excessive voltage stress on those devices. Similarly output voltage is also smooth with no glitches also indicating that the synchronous rectifiers had been enabled all along (even before soft-start is initiated!) and not enabled during the start-up transient, which would result in voltage glitch due to diode drop change in output voltage.

Experiment #3—Parallel Start-up of Unit 2 with Voltage Sense Circuit

For this experiment, the experimental prototype of FIG. 31a and the drive waveforms of FIG. 31b are used. The waveforms in FIG. 34 display the following: top trace is the drain to source voltage of the primary side duty ratio controlled switch $S_{P2}$, second trace is the gate voltage of the synchronous rectifier switch $S_2$, the third trace is the output voltage V and fourth trace is the differential voltage sense signal (V-$V_2$).

After the housekeeping power supply starts at instant $t_a$ the differentiated voltage sense signal is positive, which keeps the synchronous rectifiers disabled. When the converter starts at instant $t_b$, this results in reduction of the differentiated voltage sense signal (V-$V_2$), but since this voltage is still positive, the synchronous rectifiers are still disabled, but the converter operates by use of secondary side switching body-diodes. Then at instant $t_{OPT}$, the signal (V-$V_2$) becomes zero, which enables synchronous rectifiers. Note that the output voltage indicates a gradual increase from 4.7V to 5V with no glitches, confirming that the synchronous rectifiers are engaged and enabled at the optimum instant.

Figure 34:
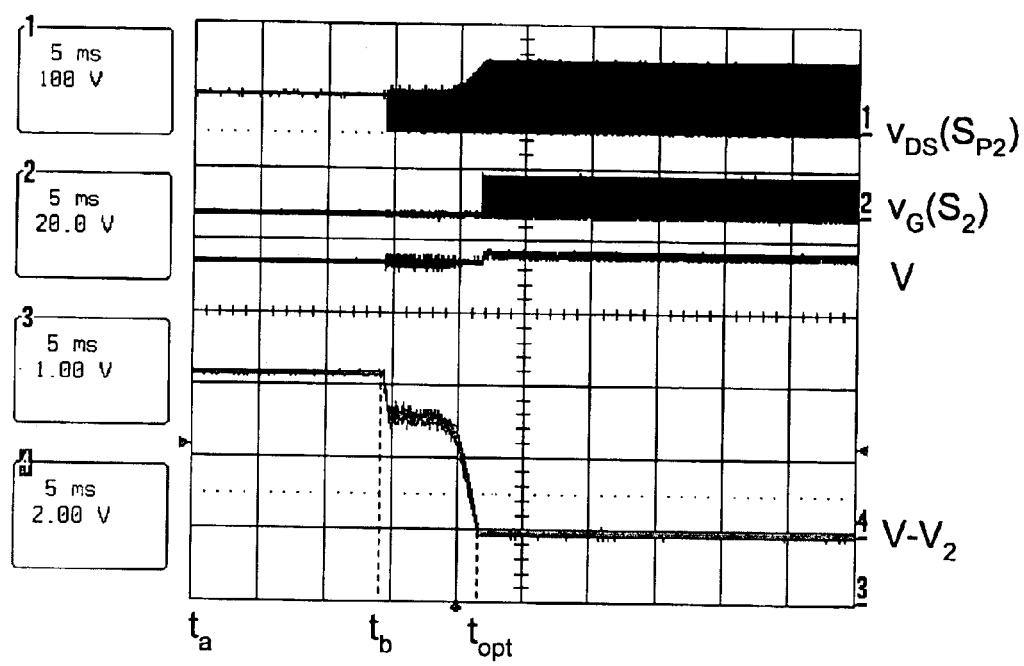
FIG. 34 illustrates the characteristic voltage waveforms during the start-up of second to start Unit 2 with Voltage Sense control, which enables synchronous rectifiers without any output voltage overshoot and without any excessive voltage stress of the primary side switches.

Note that the differentiated voltage sense signal (V-$V_2$) in FIG. 34 is different than shown in idealized and linear waveform in FIG. 31b. This is due to the fact that the two signal MOSFETs $S_{2S}$ and $S'_{2S}$ have gate threshold voltages around 3V, and are driven for simplicity from 0 to 5V logic signal. Thus, $S_{2S}$ and $S'_{2S}$ switches will not operate when (V-$V_2$) is greater than 2V. This, however, will not affect the proper operation of the voltage sense circuit, since only zero-crossing point of the voltage waveform (V-$V_2$) is needed to determine instant $t_{OPT}$ and enable synchronous rectifiers at that instant.

Start-up of Current Bi-directional Converters Operating in Parallel and Into Non-Battery (Passive) Load At the start up of a stand alone converter, the soft start circuit controls the output of the power supply to start from zero and gradually increase to the rated output voltage.

Figure 35A:
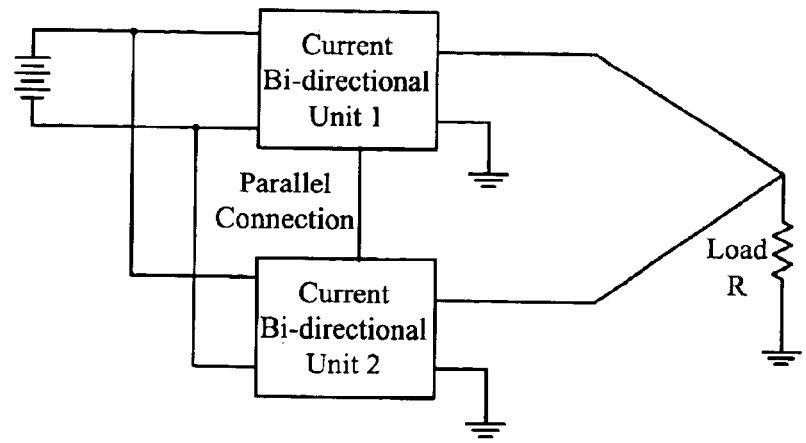
FIG. 35a illustrates two current bi-directional converters connected in parallel.

When two converters are connected in parallel, one will always start before the other. The converter which starts later (for example, Unit 2 on FIG. 35a) will see a voltage on the output at the beginning of the startup. This voltage could be as high as the rated output voltage.

If the converters in parallel have diode rectifiers on the output side (current unidirectional), the output diode of Unit 2 will remain off until the output of Unit 2 reaches rated voltage. Then the two units will share the output current through a current sharing control circuit.

Figure 35B:
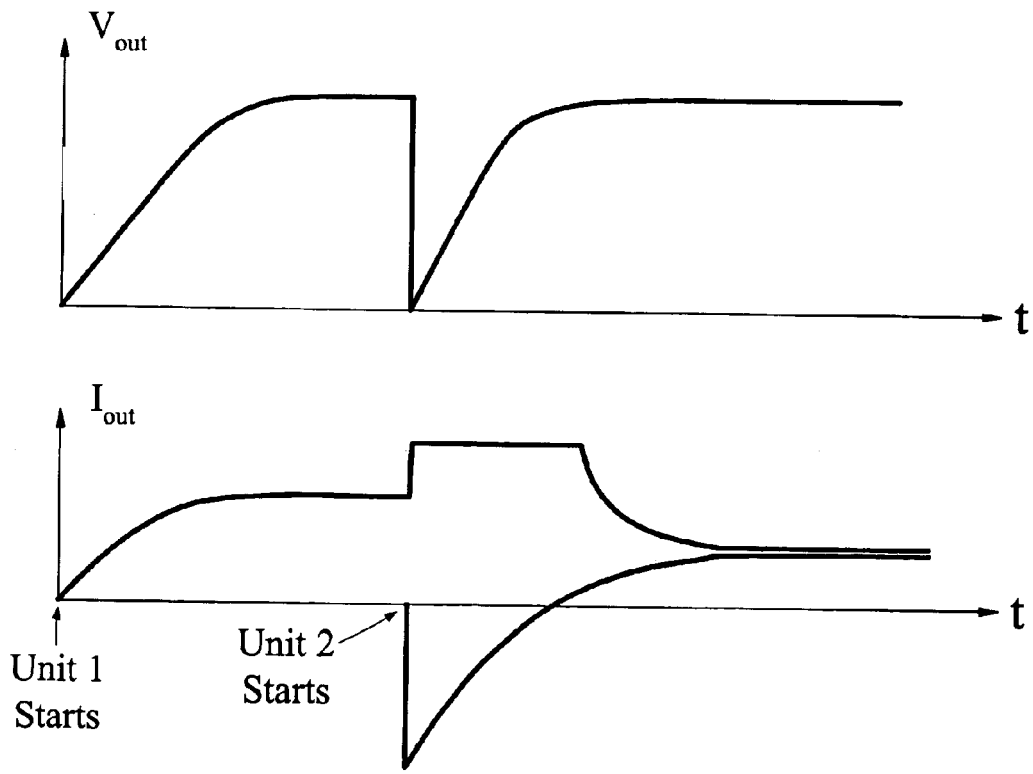

If the converters in parallel have synchronous rectifiers on the output side (current bi-directional), the soft-start and control circuit of Unit 2 will attempt to start the output voltage from zero and gradually increase to the rated voltage. However, since Unit 1 started first and the outputs of the two converters are connected together, the bi-directional converter of Unit 2 will be subject to reverse power flow and force the output voltage to zero (FIG. 35b). In this case Unit 1 will be operating at current limit, and Unit 2 will have a high current flowing backwards from the output terminals.

Start-up of Current Bi-directional Converters Into Battery Load

Figure 36:
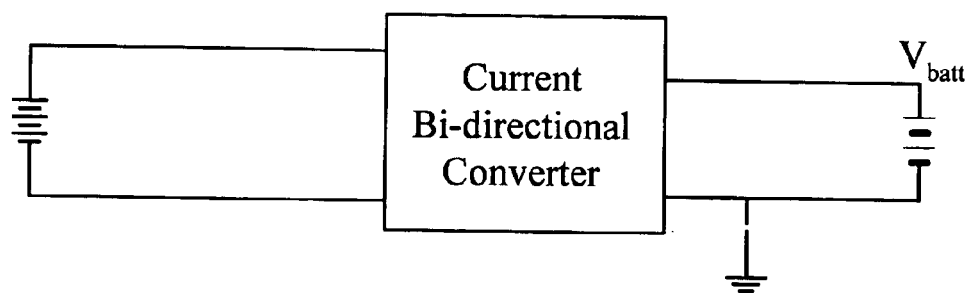
FIG. 36 illustrates a bi-directional converter with battery load.

Starting up a switching converter with synchronous rectifier into a battery load (FIG. 36) is somewhat similar to paralleling two converters with synchronous rectifiers. However, the reverse current flow problem is even more serious since the battery has very low output impedance and does not have a current limit. Therefore, if a bi-directional converter is started with a battery load the soft-start and control circuit of the converter will again attempt to start the output voltage from zero and gradually increase to the rated voltage. However, the battery has very low output impedance. When the bi-directional converter attempts to reverse the power flow to force the output voltage to zero, there will be an almost unlimited current flowing back into the converter. This excessive reverse current flow will most likely damage the converter.

Thus, a method and a circuit are needed to either prevent entirely or alleviate this problem as much as possible.

To successfully start up paralleled bi-directional converters or start up a bi-directional converter with a battery load, the following conditions must be met.

1. During startup with a battery load, the synchronous rectifiers MUST be turned off, otherwise the soft-start circuit will attempt to drag the output to zero and cause large reverse current. During startup with paralleled bi-directional converters, the synchronous rectifiers of the converter which started later MUST be turned off, otherwise the soft-start circuit will attempt to drag the output to zero and cause large reverse current.

2. At a certain time, the synchronous rectifiers should be turned on to increase the efficiency of the converter.

The key point is when to turn on the synchronous rectifiers. If the synchronous rectifiers are turned on too early, this would cause an output voltage dip and reverse current in the converter. On the other hand, if the synchronous rectifiers are turned on too late, this would cause excessive voltage stress on the primary switching devices and cause their failure.

It is ideally desired to sense the actual variation (increase) of the output voltage during the start-up if the converter were operating with synchronous rectifiers from the very beginning of the start-up. Let us call this time varying voltage $v_2$(t). Of course, we know that that the actual converter CANNOT be operated that way directly into battery load, but must instead operate during that time with diode rectifiers only. Furthermore, battery is permanently connected to the output, which would obscure any sensing of the time varying output voltage by sensing the voltage at output terminal. However, we can create an alternative simulated output voltage free of these limitations by generating an additional output voltage obtained by replicating the converters transformer secondary circuit using synchronous rectifiers but operated into a dummy load. Clearly, output voltage so simulated is $v_2$(t). The optimum time $t_{opt}$ to turn ON synchronous rectifiers in the main power converter will be when the simulated voltage $v_2$ (t) reaches the output voltage dictated by the battery $V_{batt}$ that is $v_2(t_{opt})=V_{batt}$.

Figure 37A:
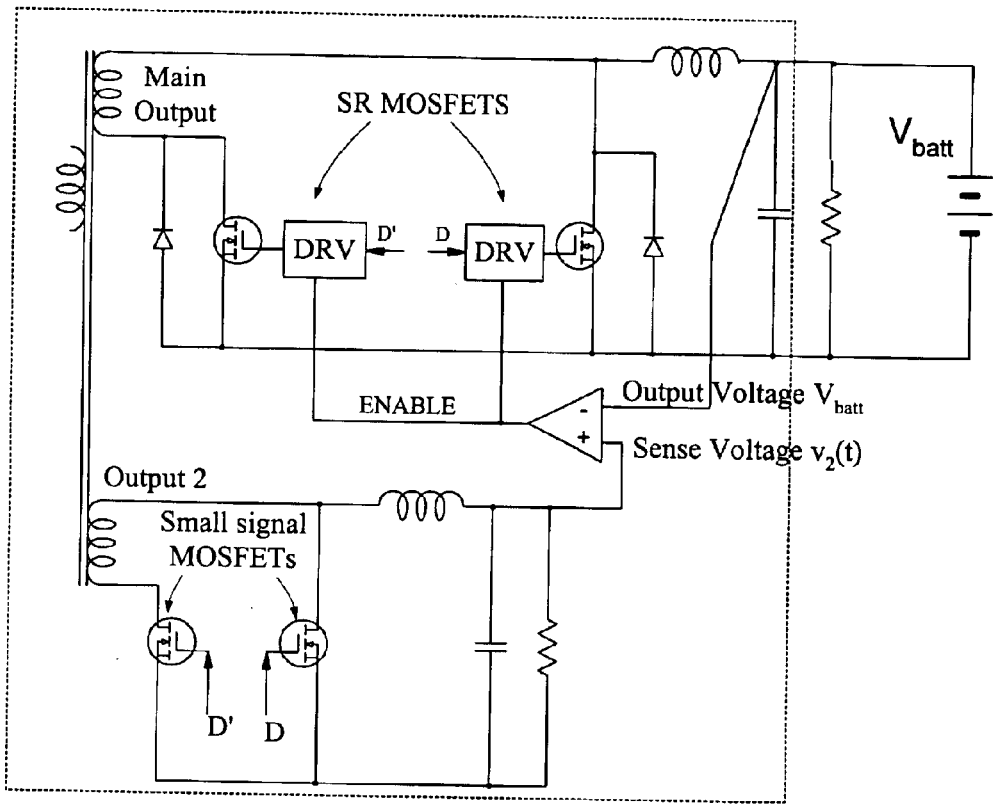
FIG. 37a illustrates how the second output winding of the transformer is used to generate v$_2$(t) for enabling the synchronous rectifiers.
Figure 37B:
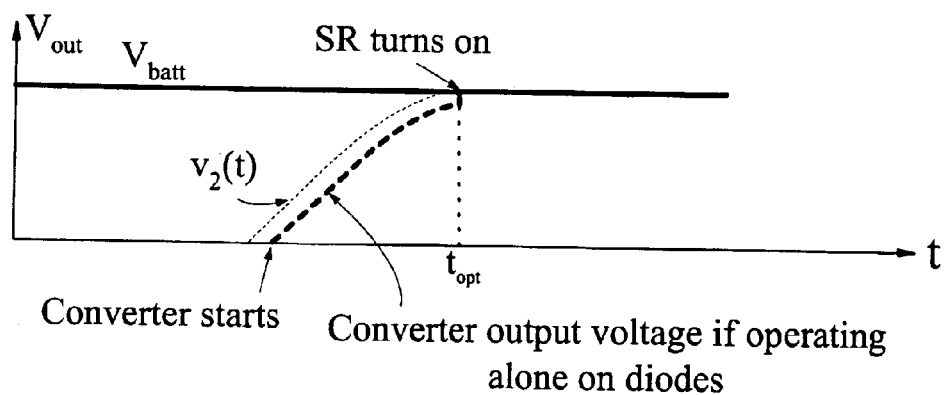
FIG. 37b illustrates the startup waveform with a battery load.
Figure 38:
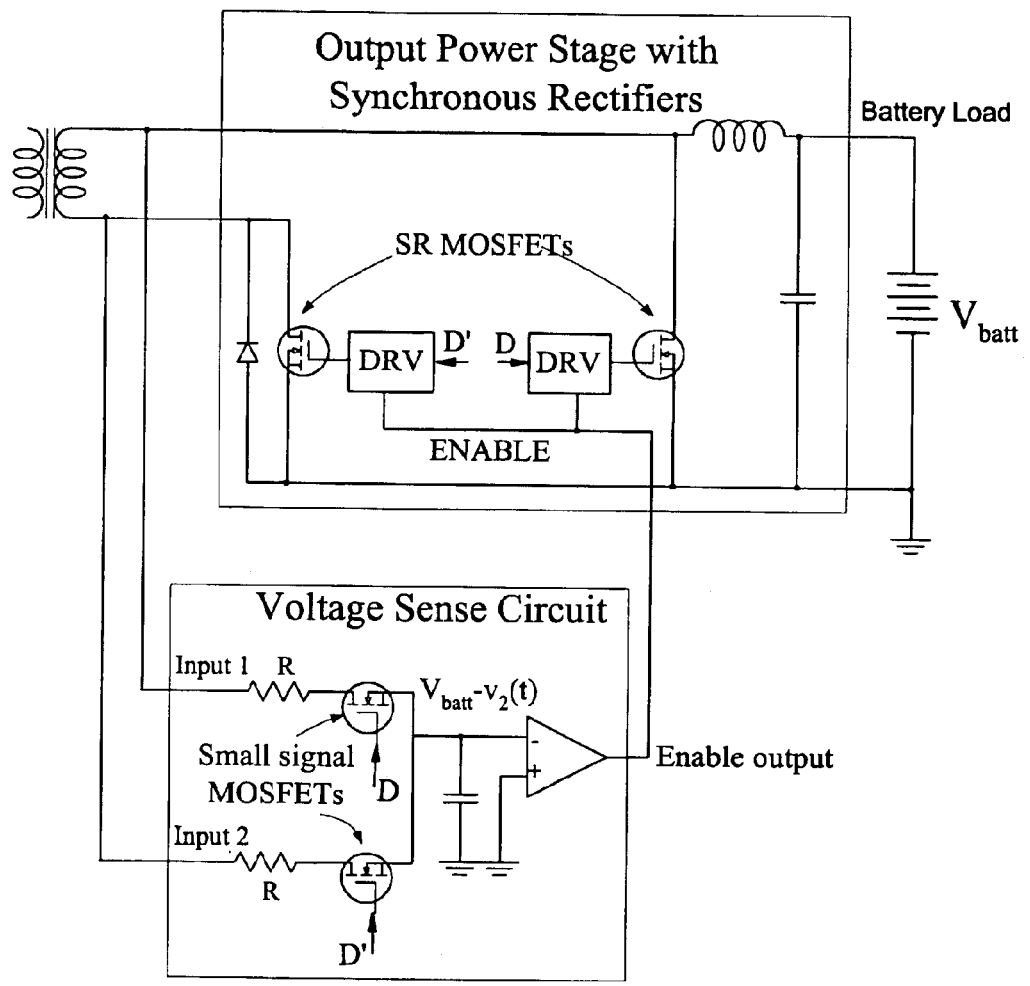
FIG. 38 illustrates the secondary power stage with synchronous rectifiers and voltage sense circuit.

This seemingly impossible task can be accomplished with a simple circuit shown in FIG. 37a. A second output winding on the transformer with a pair of small signal synchronous rectifiers generates $v_2$(t). A comparator compares $v_2$(t) with the output voltage $V_{batt}$. Finally the drive circuits for the output synchronous rectifiers are turned on when $v_2(t_{opt})=V_{batt}$ (FIG. 37b). This circuit could be simplified as shown in FIG. 4. Here, the additional windings are eliminated, and the two voltages are subtracted to obtain a ground referenced voltage to control the output synchronous rectifiers.

CONCLUSION

The switching converters designed for increased efficiency, especially for low output voltages, utilize synchronous rectifiers or more general Current Bi-directional Switches (CBS) on output. When such converters are operated in parallel, second unit to start shorts the output voltage due to presence of CBS switch in its output forcing a large reverse current through that switch and in case of several parallel modules catastrophic failure of one or more parallel units. All methods to cure this problem center on forcing each parallel unit to start with the disabled CBS and synchronous rectifier switches and conduction through their body-diodes and then at some time later enable synchronous rectifier. They differ in how they determine the instant at which synchronous rectifiers/CBS switches should be enabled.

In a prior-art Fixed Timing method, that instant is determined as a fixed time after the unit has started. If that time is too early, the dip in output voltage occurs and in worst case shorting of output would take place. If that time instant is too late, the overshoot in the output voltage will take place. But even more detrimental, this method results in excessive voltage stress of input switches during start-up of some switching converters and is especially pronounced for converters designed for low voltage outputs.

In a prior-art Current Sense method, the output current of each unit is measured during the start-up and when it becomes positive, the synchronous rectifiers/CBS switches are enabled. Apart from the difficulty of measuring high DC currents accurately and efficiently, this method also suffers from the excess voltage stress on input switches, as did Fixed Timing method.

The Voltage Sense method of the present invention determines the optimum time to enable synchronous rectifiers by use of a Voltage Sense and Synchronous Rectifier/CBS Enable circuit, termed here Voltage Sense circuit. This circuit generates a Simulated Output Voltage, which predicts how would the output voltage of each particular unit rise during the start-up with enabled synchronous rectifiers if that particular unit were to operate alone. When that simulated output voltage reaches the actual common output voltage of parallel units, this is the best time to enable synchronous rectifiers and eliminate output voltage overshoots, but even more importantly to eliminate the excess voltage stress of input switches during the start-up.

The Voltage Sense method and a number of alternative circuit implementations is very general and independent of switching converter topology. Thus it is well suited for switching converters not only with one, but two or more synchronous rectifiers/CBS switches in its output, which is not the case for prior-art methods and corresponding circuit implementations. In addition Voltage Sense circuit is also well suited for converters with different type of output rectifications, such as center-tap, half-wave, or full-wave secondary side rectification schemes. Finally no master control unit is needed, since each parallel unit has its own Voltage Sense circuit.

The Voltage Sense method and a number of alternative circuit implementations are also well suited for startup of current bi-directional converters (with one, two, or more synchronous rectifiers/CBS switches in its output) with a battery load.

Accordingly, there have been described and shown herein novel and useful method and circuit implementations for paralleling converters with synchronous rectifiers, or for current bi-directional converters operating with a battery load, so that the start-up problems associated with such operation are circumvented. Although only a limited number of particular embodiments have been illustrated and described, it is recognized that modifications and variations may readily occur to those skilled in the art. Consequently it is intended that the claims be interpreted to cover such modifications and variations of the disclosed method and its various circuit implementations.

What is claimed is:

1. A power supply system for providing regulated DC output voltage from an input DC voltage comprising:

a plurality of switching power supply units with paralleled outputs, each unit having a power processing circuitry with all output devices being current bi-directional devices providing an output voltage, each unit having a control and drive circuitry, each unit having a simulating circuitry providing a simulated output voltage with said all output current bi-directional devices of respective unit enabled, and each unit having an enabling signal circuitry, wherein each said enabling signal circuitry enables during start-up said all output current bi-directional devices of respective unit at instant when said simulated output voltage rises to said regulated DC output voltage, whereby, said regulated DC output voltage has no overshoot spikes regardless of start-up order of said plurality of switching power supply units, whereby, during a start-up of said power supply system, input switching devices of said plurality of switching power supply units are exposed to respective voltage stresses, which do not exceed voltage stresses on said input switching devices during steady-state operation.

2. A power supply system as defined in claim 1 for providing regulated DC output voltage to a battery load, wherein said battery load is connected in parallel with paralleled outputs of said plurality of switching power supply units, wherein each said enabling signal circuitry enables during start-up said all output current bi-directional devices of respective unit at instant when said simulated output voltage rises to a voltage level of said battery load, whereby, there are no overshoot spikes at said battery load regardless of start-up order of said plurality of switching power supply units, whereby, during a start-up of said power supply system, input switching devices of said plurality of switching power supply units are exposed to respective voltage stresses, which do not exceed voltage stresses on said input switching devices during steady-state operation.

3. A power supply system as defined in claim 2, wherein said plurality of switching power supplies comprises a single switching power supply, wherein said enabling signal circuitry enables during start-up said all output current bi-directional devices of said single switching power supply at instant when said simulated output voltage rises to a voltage level of said battery load, whereby, there are no overshoot spikes at said battery load during start-up of said single switching power supply, whereby, during a start-up of said single switching power supply, input switching devices of said single switching power supply are exposed to respective voltage stresses, which do not exceed voltage stresses on said input switching devices during steady-state operation.

4. A voltage sense circuitry for both simulating an output voltage of a DC-to-DC switching converter and enabling turning ON and turning OFF signals of a power Current Bi-directional Switching devices at the output of said DC-to-DC switching converter, said voltage sense circuitry comprising:

a low-power Current Bi-directional Switching devices for each of respective said power Current Bi-directional Switching devices at the output of said DC-to-DC switching converter, means for connecting said low-power Current Bi-directional Switching devices in an emulated output circuitry of said DC-to-DC switching converter, switching time control means for providing turning ON and turning OFF signals to said low-power Current Bi-directional Switching devices in the same pattern as turning ON and turning OFF signals needed for said power Current Bi-directional Switching devices to operate as Synchronous Rectifiers, means for enabling turning ON and turning OFF signals of said power Current Bi-directional Switching devices at the output of said DC-to-DC switching converter, wherein said emulated output circuitry provides a simulated output voltage of said DC-to-DC converter with said power Current Bi-directional Switching devices operating as Synchronous Rectifiers, wherein, during a start-up of said DC-to-DC switching converter, turning ON and turning OFF signals for said power Current Bi-directional Switching devices at the output of said DC-to-DC switching converter are enabled after said simulated output voltage equals a voltage at the output of said DC-to-DC converter, whereby said voltage at the output of said DC-to-DC switching converter does not experience any voltage spike when turning ON and turning OFF signals for said power Current Bi-directional Switching devices at the output of said DC-to-DC switching converter are enabled, whereby, during said start-up of said DC-to-DC switching converter, input switching devices of said DC-to-DC switching converter are exposed to respective voltage stresses, which do not exceed voltage stresses on said input switching devices during steady-state operation.

5. A voltage sense circuitry as defined in claim 4, wherein a battery load is connected in parallel with the output of said DC-to-DC switching converter, wherein, during a start-up of said DC-to-DC switching converter, turning ON and turning OFF signals for said power Current Bi-directional Switching devices at the output of said DC-to-DC switching converter are enabled after said simulated output voltage equals a voltage of said battery load, whereby said voltage of said battery load at the output of said DC-to-DC switching converter does not experience any voltage spike when turning ON and turning OFF signals for said power Current Bi-directional Switching devices at the output of said DC-to-DC switching converter are enabled, whereby, during said start-up of said DC-to-DC switching converter, input switching devices of said DC-to-DC switching converter are exposed to respective voltage stresses, which do not exceed voltage stresses on said input switching devices during steady-state operation.

6. A method for preventing a voltage spike overshoot on a common output terminal during a start-up of plurality of DC-to-DC switching converters, the outputs of which are connected to said common output voltage terminal, each of said plurality of DC-to-DC switching converters having a Current Bi-directional Switch connecting its respective voltage outputs to said common output terminal, said method comprising:

creating a simulated output voltage for each respective DC-to-DC switching converter operating with said Current Bi-directional Switches enabled and disconnected from said common output voltage during said start-up, enabling said Current Bi-directional Switches in said respective power output when said simulated output voltage reaches said common output voltage, resulting in both no voltage overshoot on said common output voltage and no reverse currents through said Current Bi-directional Switches in said respective power output during said start-up, whereby a start-up voltage stress on input switching devices of said respective switching converter does not exceed a voltage stress on said input switching devices during a steady-state operation of said respective switching converter.

7. A method as defined in claim 6, wherein a battery load is connected in parallel with said common terminal, wherein said Current Bi-directional Switches in said respective power output are enabled when said simulated output voltage reaches a voltage level of said battery load, resulting in both no voltage overshoot on said battery load and no reverse currents through said Current Bi-directional Switches in said respective power output during said start-up, whereby a start-up voltage stress on input switching devices of said respective switching converter does not exceed a voltage stress on said input switching devices during a steady-state operation of said respective switching converter.

8. A method as defined in claim 7, wherein said plurality of DC-to-DC switching converters comprises a single DC-to-DC switching converter, wherein said Current Bi-directional Switches in said power output are enabled when said simulated output voltage reaches a voltage level of said battery load, resulting in both no voltage overshoot on said battery load and no reverse currents through said Current Bi-directional Switches in said power output during said start-up, whereby a start-up voltage stress on input switching devices of said single DC-to-DC switching converter does not exceed a voltage stress on said input switching devices during a steady-state operation of said single DC-to-DC switching converter.

* * * * *